US008127719B2

(12) United States Patent
Jakubowski et al.

(10) Patent No.: US 8,127,719 B2
(45) Date of Patent: Mar. 6, 2012

(54) FOLDABLE PET CRATE

(75) Inventors: Todd M. Jakubowski, Rutland, VT (US); Scott S. Jakubowski, Castleton, VT (US); Chris Jakubowski, Rutland Town, VT (US); Guang-Shen Lin, South Zhongshan (CN)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 969 days.

(21) Appl. No.: 12/062,233

(22) Filed: Apr. 3, 2008

(65) Prior Publication Data

US 2008/0245313 A1    Oct. 9, 2008

Related U.S. Application Data

(60) Provisional application No. 60/991,833, filed on Dec. 3, 2007.

(51) Int. Cl.
*A01K 1/03*    (2006.01)

(52) U.S. Cl. ....................................... 119/499; 119/474

(58) Field of Classification Search .................. 119/461, 119/474, 491, 492, 498, 499
See application file for complete search history.

(56) References Cited

U.S. PATENT DOCUMENTS 700,774 A * 5/1902 Holmes ........................... 217/47
(Continued)

*Primary Examiner* — Kimberly Smith
(74) *Attorney, Agent, or Firm* — Volpe and Koenig, P.C.

(57) ABSTRACT

A pet crate is provided having a blow molded polymeric base along with side, front and top panels made with strong, lightweight polymeric frame members and grates. The grates are used in the front, back and side panels to provide strength as well as a large open mesh area for better visibility and pet comfort. The mesh preferably is provided as hinged access panels at least on the sides. The front and top of the crate are also openable for access to the pet crate. The pet crate is collapsible to a folded, flat condition by unlatching the front panel and stowing it along the inside of the top panel and releasing latches between the top and back panels and the side panels. The side panels, back panel and top panel can then be collapsed inwardly onto one another to form a generally flat, stowed configuration for the pet crate.

24 Claims, 29 Drawing Sheets

U.S. PATENT DOCUMENTS

| | | | |
|---|---|---|---|
| 844,955 A * | 2/1907 | Morgan | 220/8 |
| 1,192,415 A * | 7/1916 | Giseke | 220/7 |
| 2,713,347 A | 7/1955 | Hazy | |
| 4,484,540 A * | 11/1984 | Yamamoto | 119/497 |
| 5,626,098 A * | 5/1997 | Askins et al. | 119/474 |
| 5,669,331 A | 9/1997 | Richmond | |
| 6,021,740 A | 2/2000 | Martz | |
| 6,092,488 A | 7/2000 | Allawas | |
| 6,345,591 B1 * | 2/2002 | Richmond | 119/497 |
| 7,201,116 B2 * | 4/2007 | Axelrod | 119/496 |
| 2001/0035411 A1 | 11/2001 | Kofod | |
| 2005/0150892 A1 | 7/2005 | Miller | |
| 2006/0174841 A1 | 8/2006 | Axelrod | |
| 2008/0121188 A1 * | 5/2008 | Axelrod et al. | 119/499 |

* cited by examiner

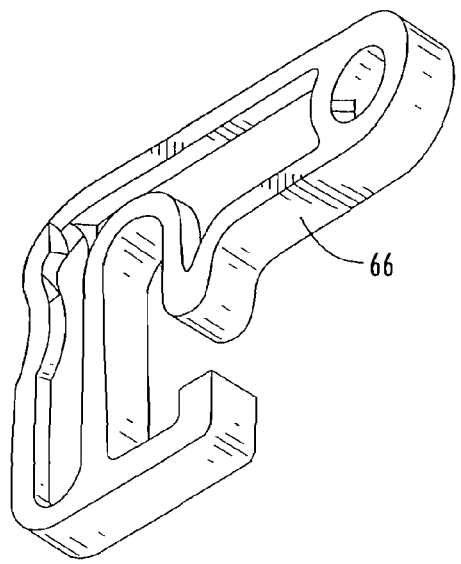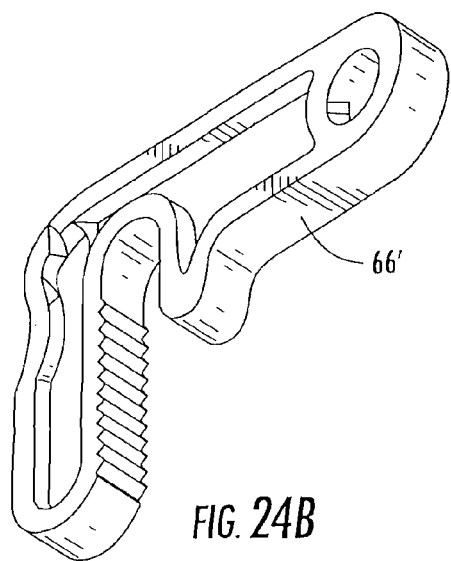
FIG. 24A  FIG. 24B
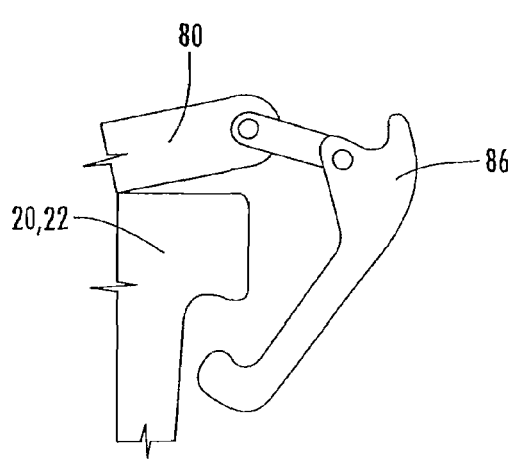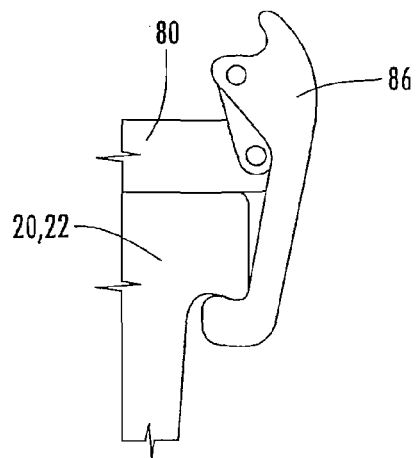
FIG. 34A  FIG. 34B

FOLDABLE PET CRATE

BACKGROUND

The invention relates to a foldable pet crate, and more particularly to a light weight, foldable pet crate which can be erected to form a rigid structure having multiple access doors.

Pet crates allow pet owners to place pets in a confined area in order to prevent pets from roaming about when the owner is not home, and are also used for transporting pets safely so that a pet does not escape during travel and potentially become lost or injured. Additionally, certain animals such as dogs find comfort in cave-like areas provided by a pet crate. Thus, pet crates have a variety of uses for both home and travel.

Known pet crates have several drawbacks. One is the fact that most crates are made from steel which provides the required security for larger animals, but has sharp edges and/or corners that can cut into material upon which the crate is placed as well as scrape both the owner and the pet during movement. Additionally, the all steel crates generally weigh more, and are often difficult to erect and collapse, requiring flexing of the metal pieces in order to have the panel end hooks engage with corresponding structure affixed to the side, top or end panels. Additionally, there is no easy way to move such crates while folded or if an animal is within the crate. Finally, most pet crates have only a single door which provides challenges to the pet owner if the pet is uncooperative or something is blocking one of the doors based on a position of the crate either within a vehicle or other confined space during travel.

SUMMARY

Briefly stated, the present invention provides a pet crate having a base along with side, front and top panels that form a strong, lightweight frame, preferably formed of a rigid polymeric material, and grates located within the frame. The grates are preferably provided in the front, back and side panels to provide an open mesh area for better visibility and pet comfort. The grates are preferably provided as hinged access panels at least on the sides. The front and top of the crate are preferably also openable for access in to the pet crate.

The pet crate is collapsible to a folded, flat condition by unlatching the front panel and stowing it along the inside of the top panel and releasing latches to allow the side panels, back panel and top panel to be collapsed inwardly onto one another to form a generally flat, stowed configuration for the pet crate.

In the preferred embodiment, the use of a molded polymeric bottom provides rigidity as well as an easily cleanable structure for the pet crate. Preferably, the bottom of the pet crate includes wheels to allow for easy movement of the pet crate in both the erected and stowed configurations, with or without a pet located therein. A pull handle is provided on top of the pet crate, on an opposite side from the wheels, for ease of movement.

BRIEF DESCRIPTION OF THE DRAWINGS

The following detailed description of the preferred embodiments of the invention will be better understood when read with reference to the appended drawings. For the purposes of illustrating the invention, there is shown in the drawing an embodiment which is presently preferred. It is understood, however, that the invention is not limited to the precise arrangements and instrumentality shown in the drawings.

FIG. 24a is an enlarged detail view of a preferred catch with a smooth surface and C-shaped end portion used for holding the split rear walls of the pet crate in the unfolded position.

FIG. 24b is an enlarged detail view of an alternate catch with a ribbed surface used for holding the split rear walls of the pet crate in the unfolded position.

FIG. 34a is an enlarged profile view of a latch on the side edge of the top panel in an open position.

FIG. 34b is the enlarged profile view of the latch of FIG. 34a in a closed position.

DETAILED DESCRIPTION OF THE PREFERRED EMBODIMENTS

Figure 1:
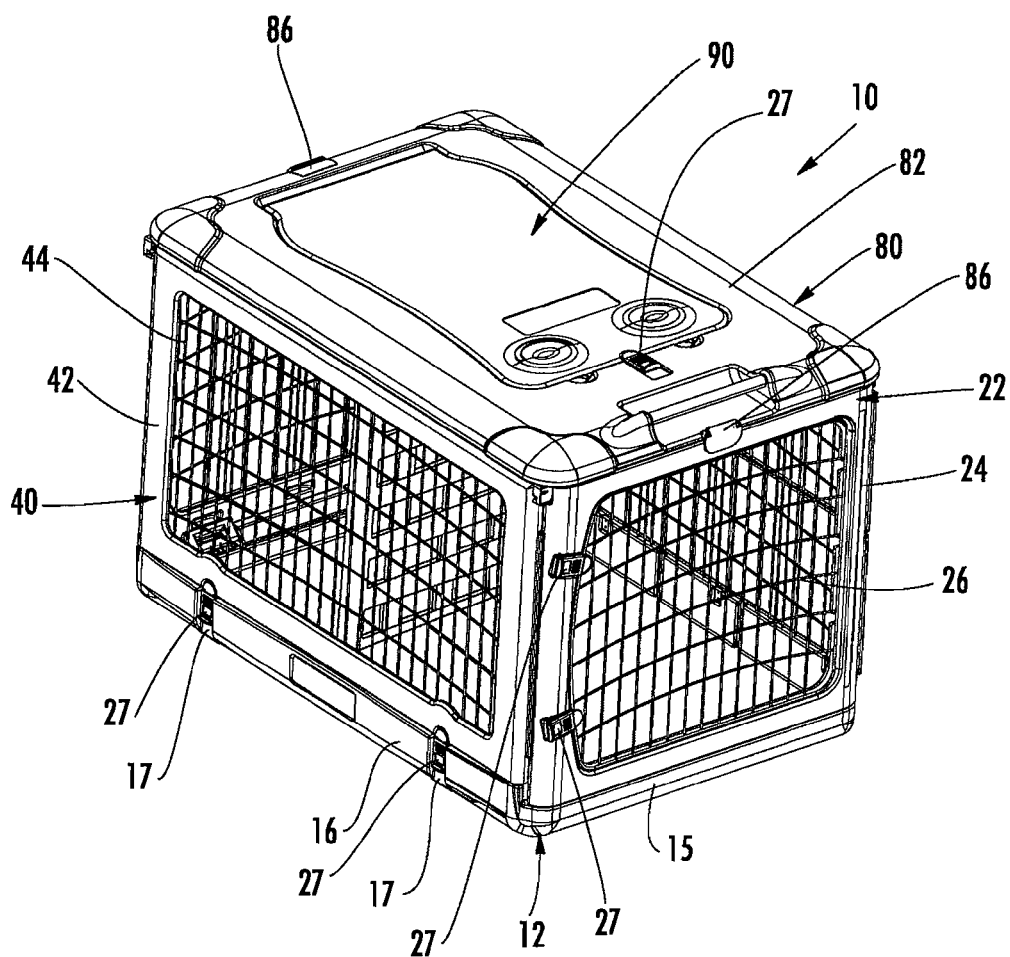
FIG. 1 is a top, right, front perspective view of a pet crate according to a preferred embodiment of the present invention.

Certain terminology is used in the following description for convenience only and is not limiting. The words "right", "left", "top", "bottom", "front", and "back" designate directions in the drawings to which reference is made. The words "inwardly" and "outwardly" refer to directions toward and away from, respectively, the geometric center of the pet crate and designated parts thereof. The words "a" and "one", as used in the claims and in the corresponding portion of the specification, are defined as including one or more of the referenced item unless specifically stated otherwise. This terminology includes the words specifically noted above, derivatives thereof and words of similar import.

Referring now to FIGS. 1-25, wherein like numerals indicate like elements throughout, a preferred embodiment of a foldable pet crate 10 is shown. The pet crate 10 includes a base 12, left side 20, right side 22, front door 40, split rear wall 60 and top panel 80. The base has left, right, front and back base walls, and a bottom panel. These components and their assembly to form the foldable pet crate 10 are described in detail below along with the method for transitioning the pet crate from an assembled to a folded position.

Figure 6:
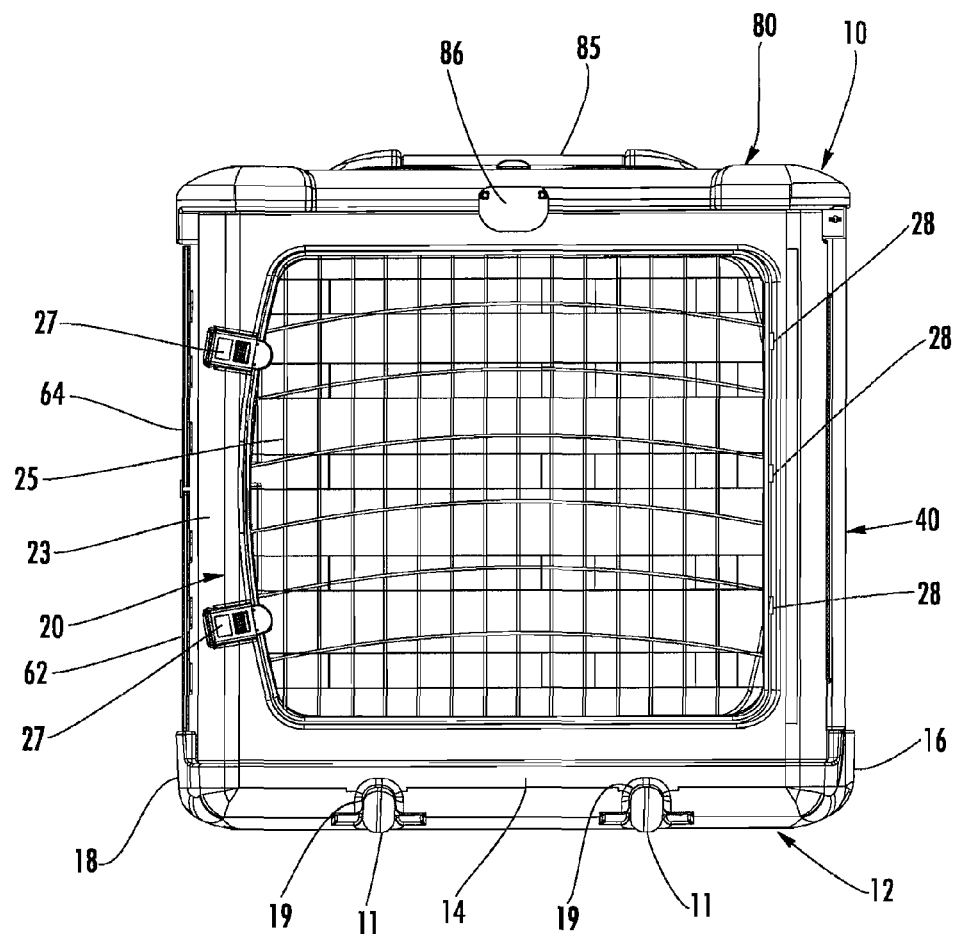
FIG. 6 is a left side elevational view of the pet crate of FIG. 1.
Figure 7:
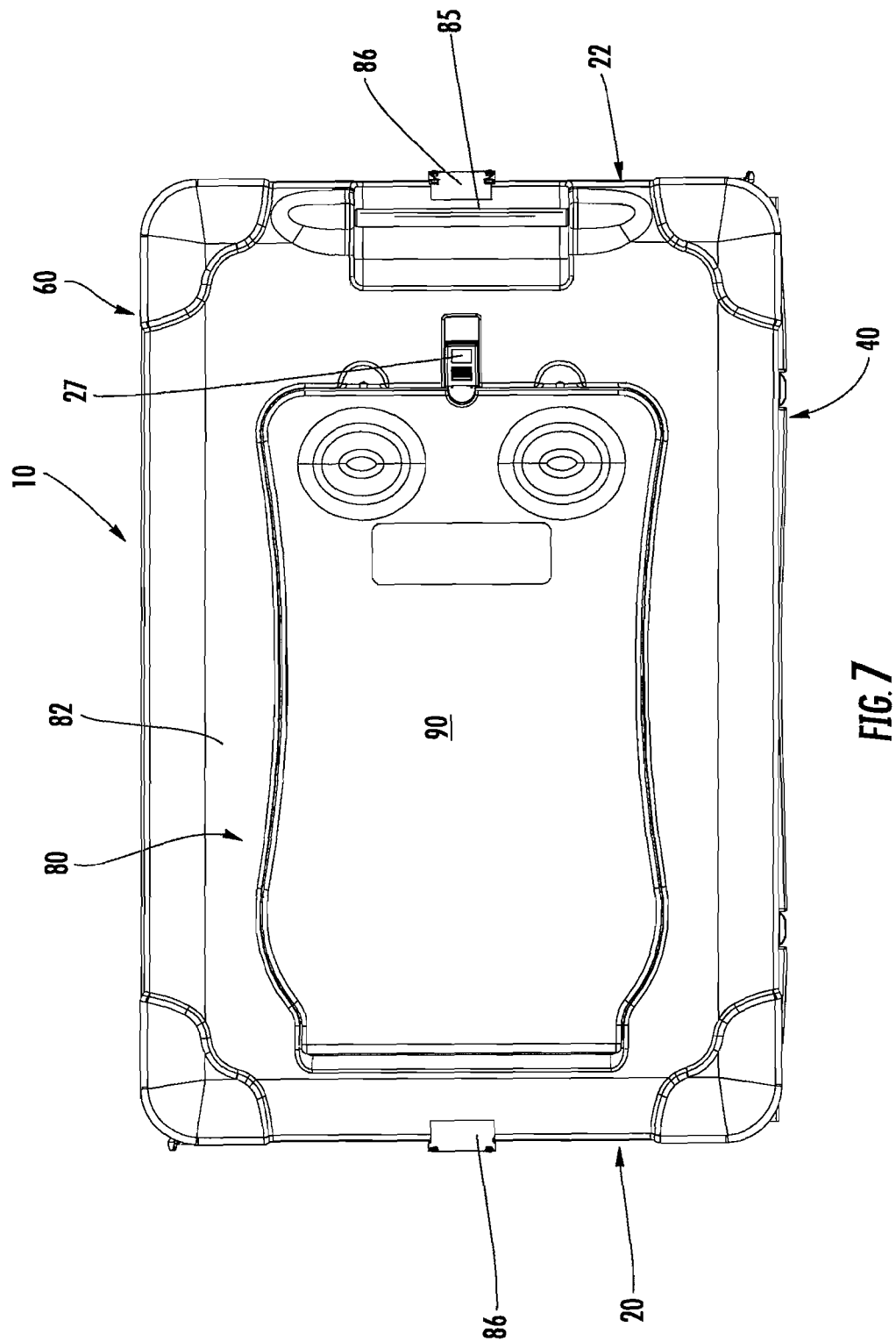
FIG. 7 is a top view of the pet crate of FIG. 1.
Figure 14:
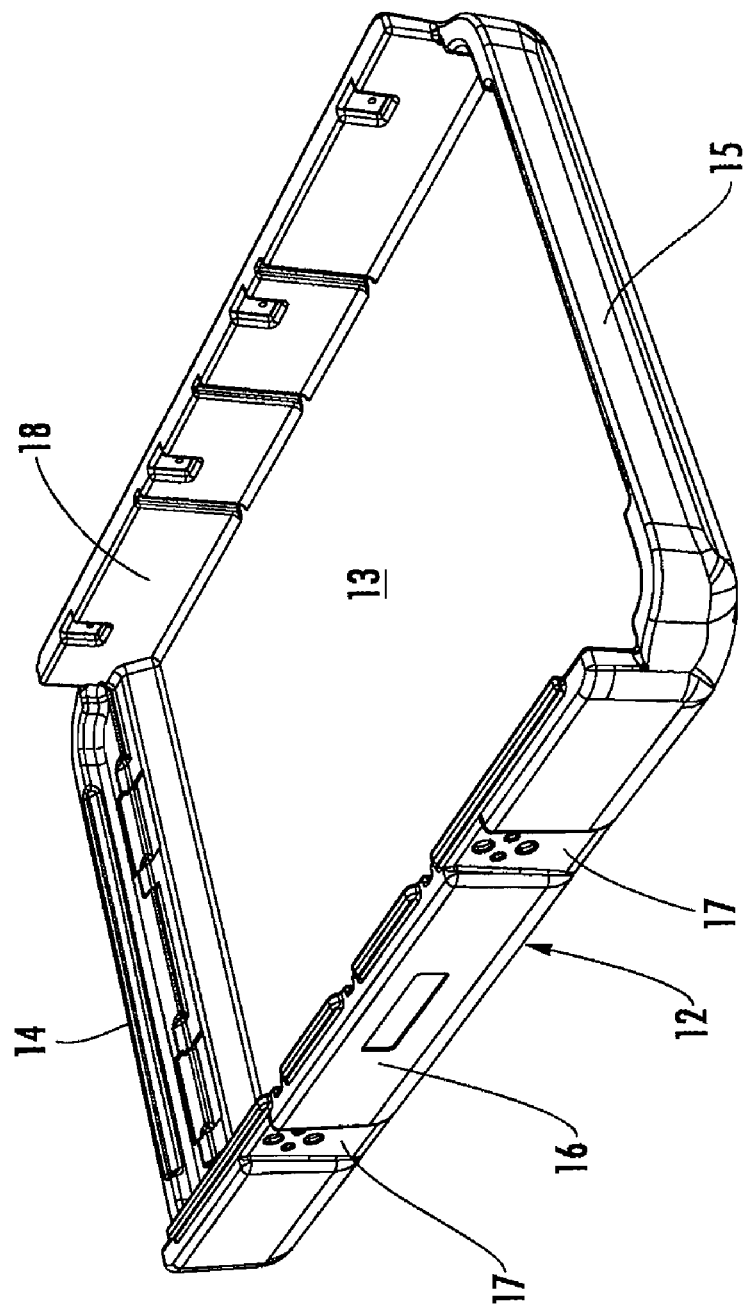
FIG. 14 is a detailed perspective view looking into the base of the pet crate of FIG. 1.
Figure 15:
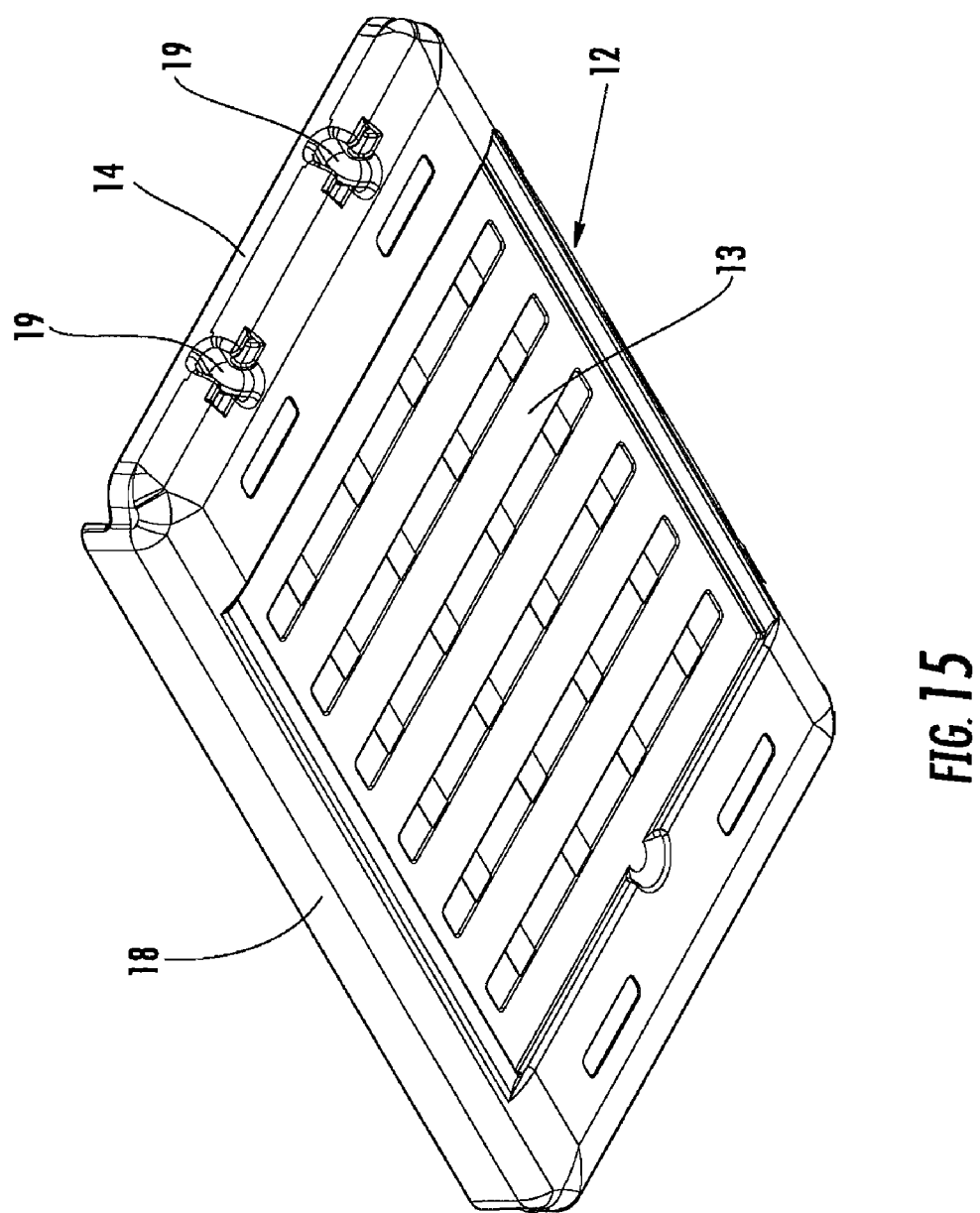
FIG. 15 is a bottom perspective view of the base of the pet crate of FIG. 14.

Referring to FIGS. 1-3, 9, 10, 14 and 15, the base 12 is shown in detail. The base 12 preferably includes a bottom panel 13 side walls 14, 15, a front wall 16 with two latch mounting recesses 17, and a back wall 18. The corners of the base 12 are rounded to prevent damage to items the crate may be rested on, such as flooring or a car seat. Wheel recesses 19 are provided in which wheels 11, shown in FIG. 6, are detachably mounted. The base 12 is preferably formed as a blow molded polymeric component in a single piece having an inner skin and an outer skin with reinforcements being provided by projections and recesses on the bottom thereof, as shown in detail in FIG. 15. As shown in FIG. 14, preferably the inner surface of the base 12 is smooth to allow for easy clean-ups. The side walls 14, 15, front wall 16 and back wall 18 help to contain spills or pet accidents. While the preferred material is polypropylene, those skilled in the art will recognize that other suitable polymeric materials and possibly other materials may be used to form the base 12.

Figure 2:
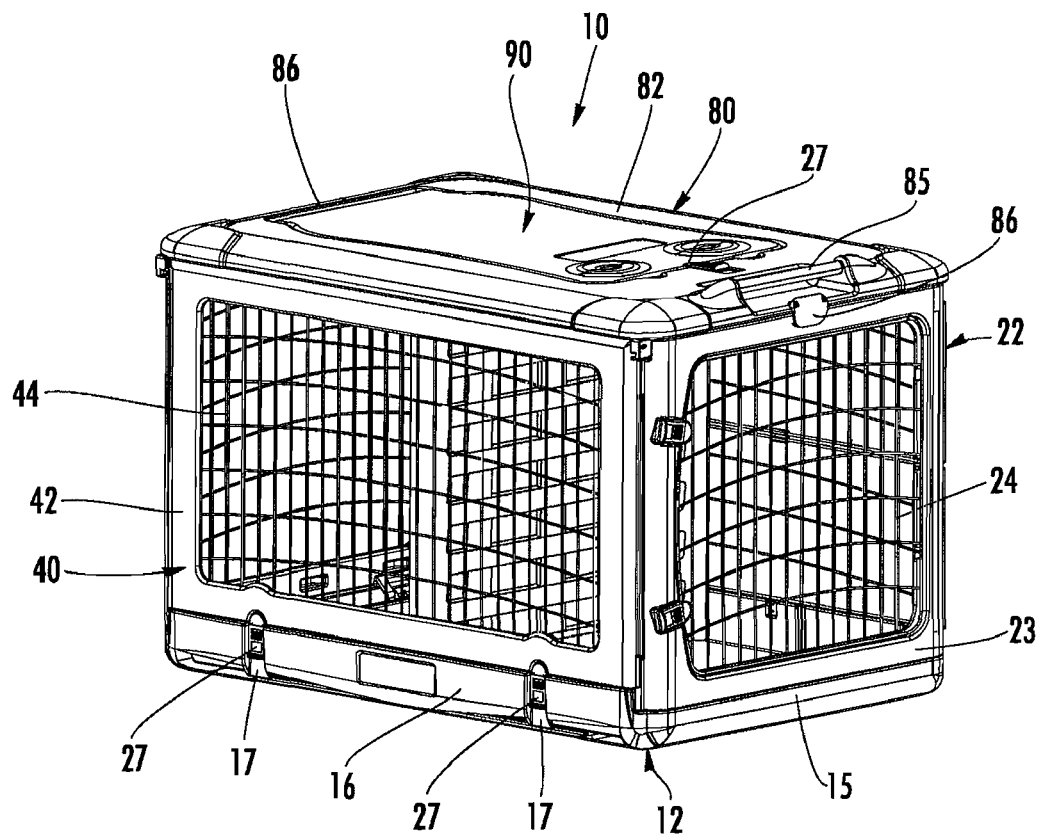
FIG. 2 is a perspective view similar to FIG. 1.
Figure 3:
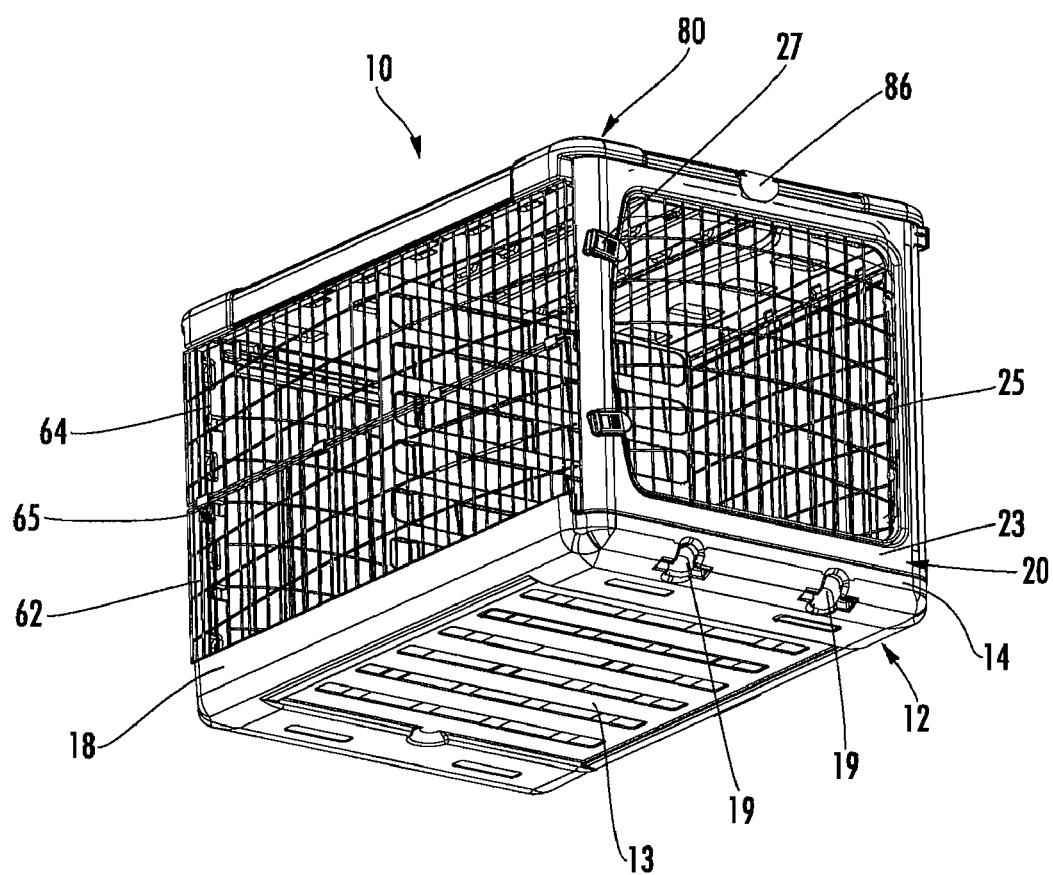
FIG. 3 is a bottom, left, rear perspective view of the pet crate according to the invention.
Figure 4:
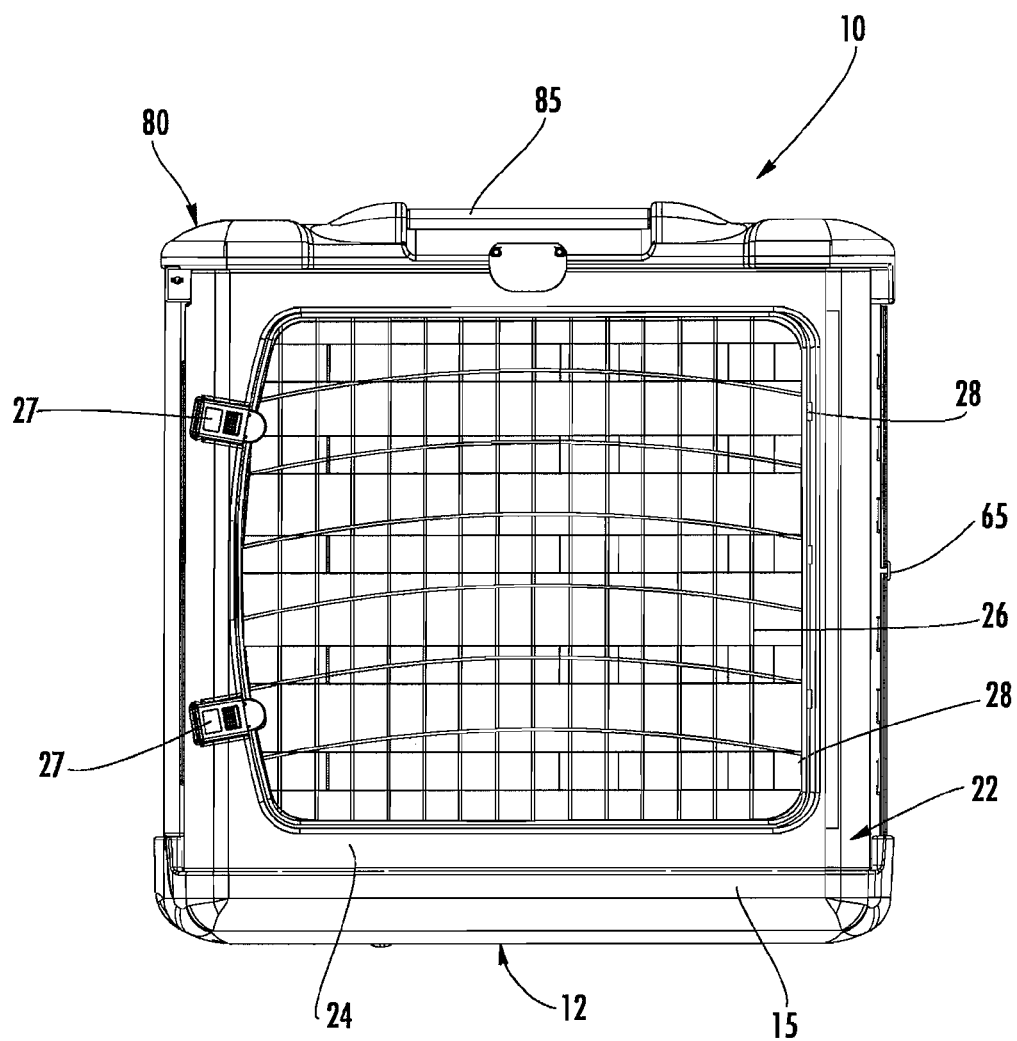
FIG. 4 is a right side elevational view of the pet crate of FIG. 1.
Figure 5:
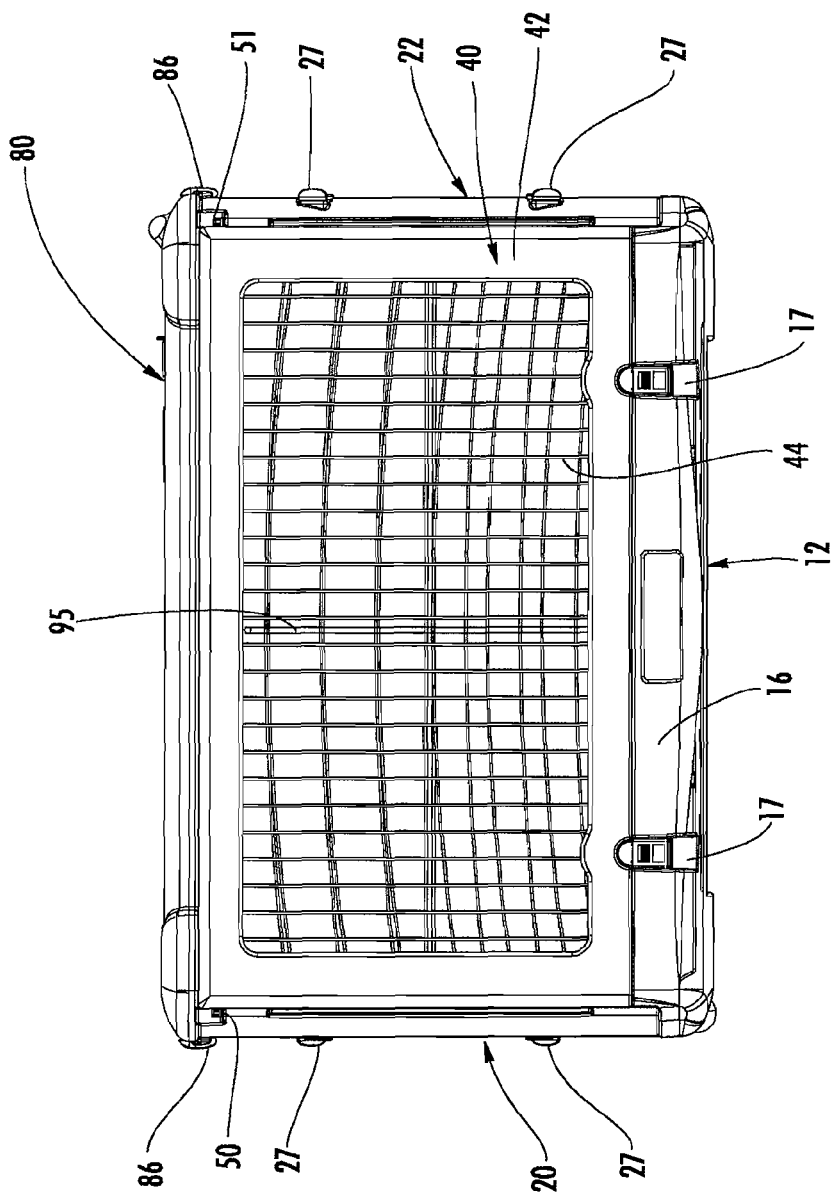
FIG. 5 is a front elevational view of the pet crate of FIG. 1.

Referring to FIGS. 1-4, 6, 10, 16 and 17, the left and right sides 20, 22 are shown. The left and right sides 20, 22 each include a polymeric frame member 23, 24 respectively, in which a respective air-permeable grate 25, 26 is pivotably mounted. The grates 25, 26 are preferably a metal grates, but also may be a metal mesh, a fabric screen, or a flat panel with holes formed therein. Latches 27 are provided at the rear edge of the left side 20 and at the front edge of the right side 22 to hold the pivoting grates 25, 26 in a closed-position. The grates 25, 26 form doors for ingress and egress from the crate 10. The front edge of the left side grate 25 is preferably, pivotally mounted to the front of the frame 23 using clips 28, see FIG. 6 for the left side, and a rear edge of the grate 26 for the right side 22 is pivotally mounted to the rear edge of the frame 24 also using clips 28, as shown in FIG. 4. As will be more clearly recognized from FIGS. 1-3, this provides two separate side doors for ingress and egress which is particularly useful when the center divider 95 is slid into channels formed in the top panel and the base, to split the main confine area in crate 10 into two separate confined areas.

Figure 16:
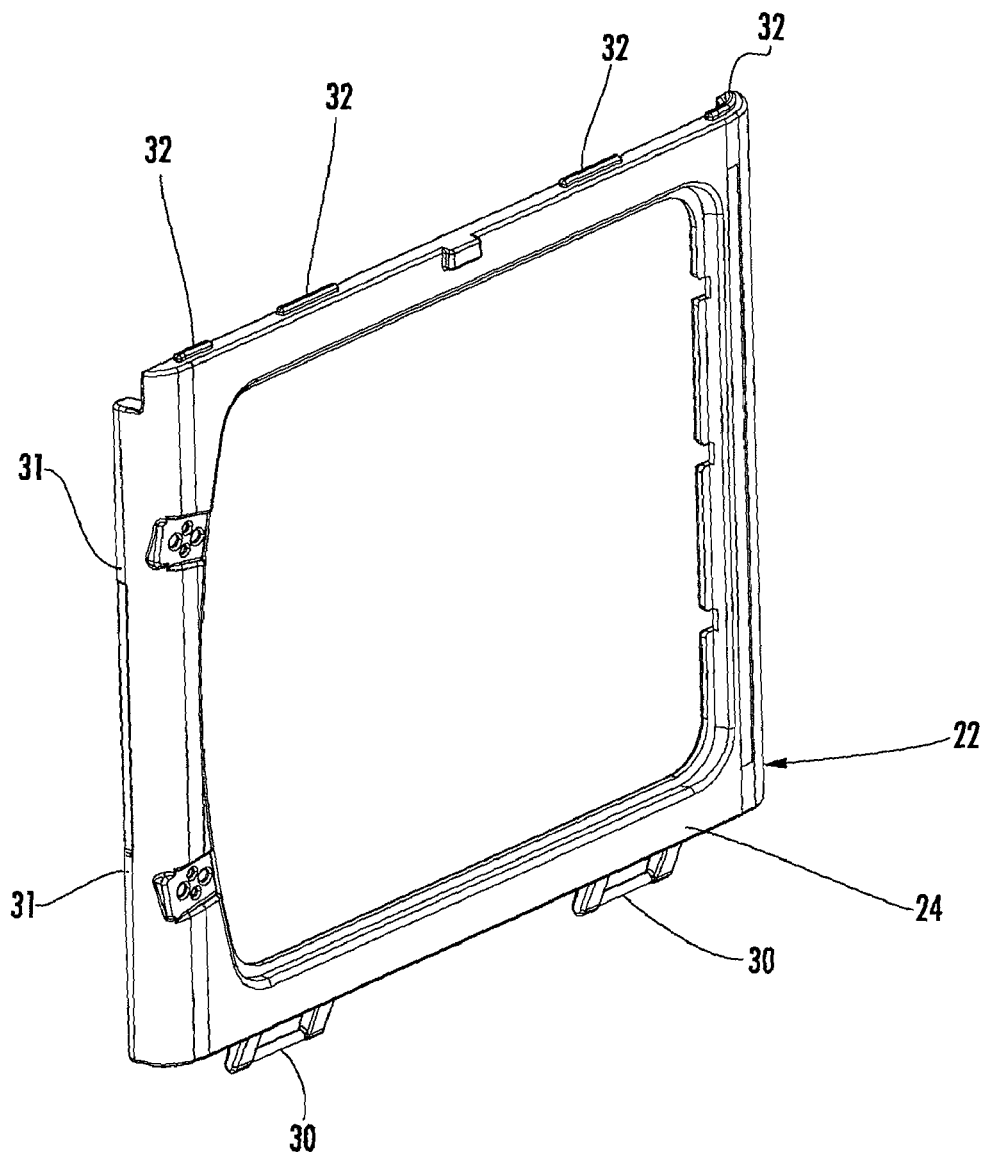
FIG. 16 is a detailed perspective view of the right side frame.
Figure 17:
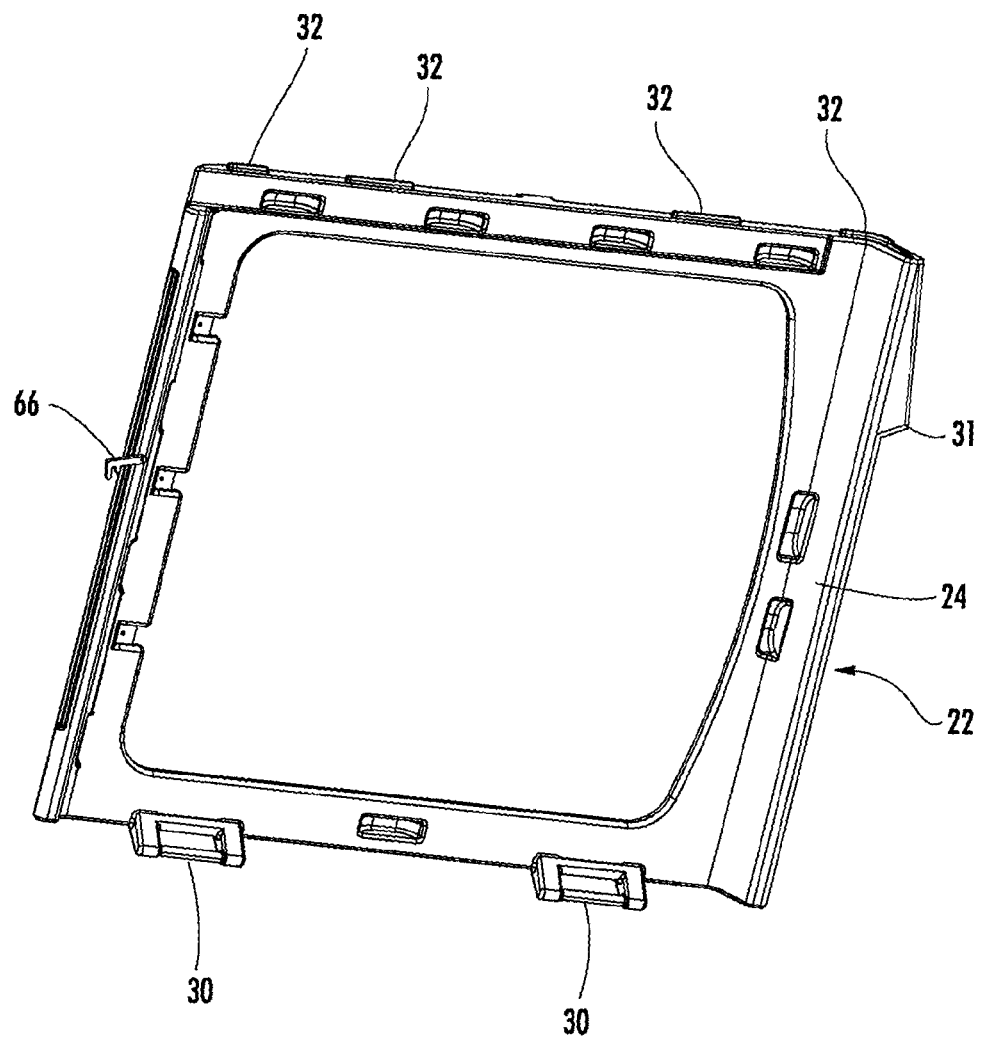
FIG. 17 is a perspective view of the right side frame looking from inside outwardly.
Figure 18:
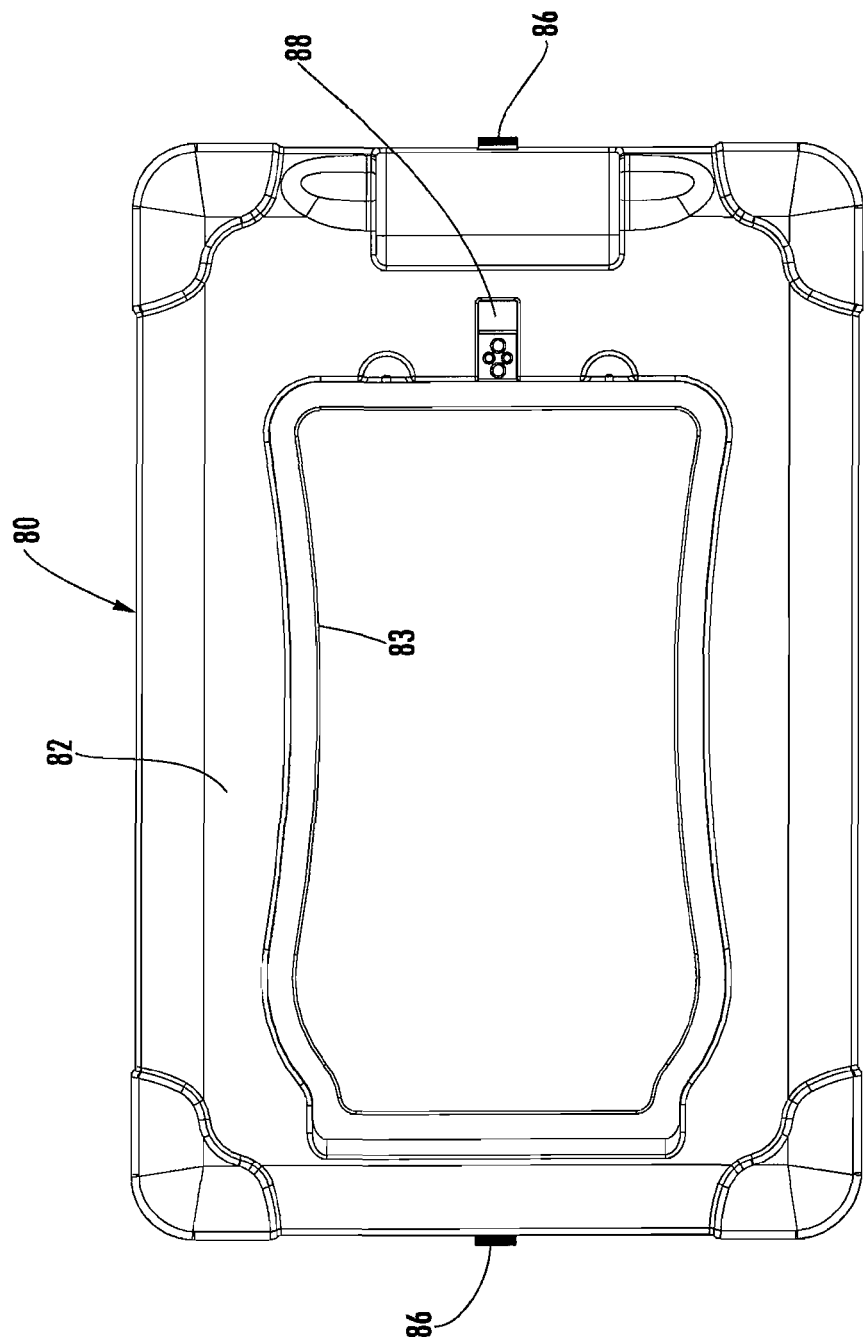
FIG. 18 is a detailed view of the top of the pet crate.

As shown in detail in FIGS. 16 and 17, hinge lugs 30 are provided at the bottom of the frames 23, 24. The hinge lugs 30 are connected via brackets to the base 12 in order to allow the left side and right side panels to pivot down into the base 12 during a folding operation for placing the crate 10 into a folded position. Additionally, as shown most clearly in FIGS. 10 and 16, engagement protrusions 31 are provided along the front edges of the frames 23, 24 for holding the front door 40 to prevent racking when the front door 40 is in the closed position, as described in more detail below.

Figure 10:
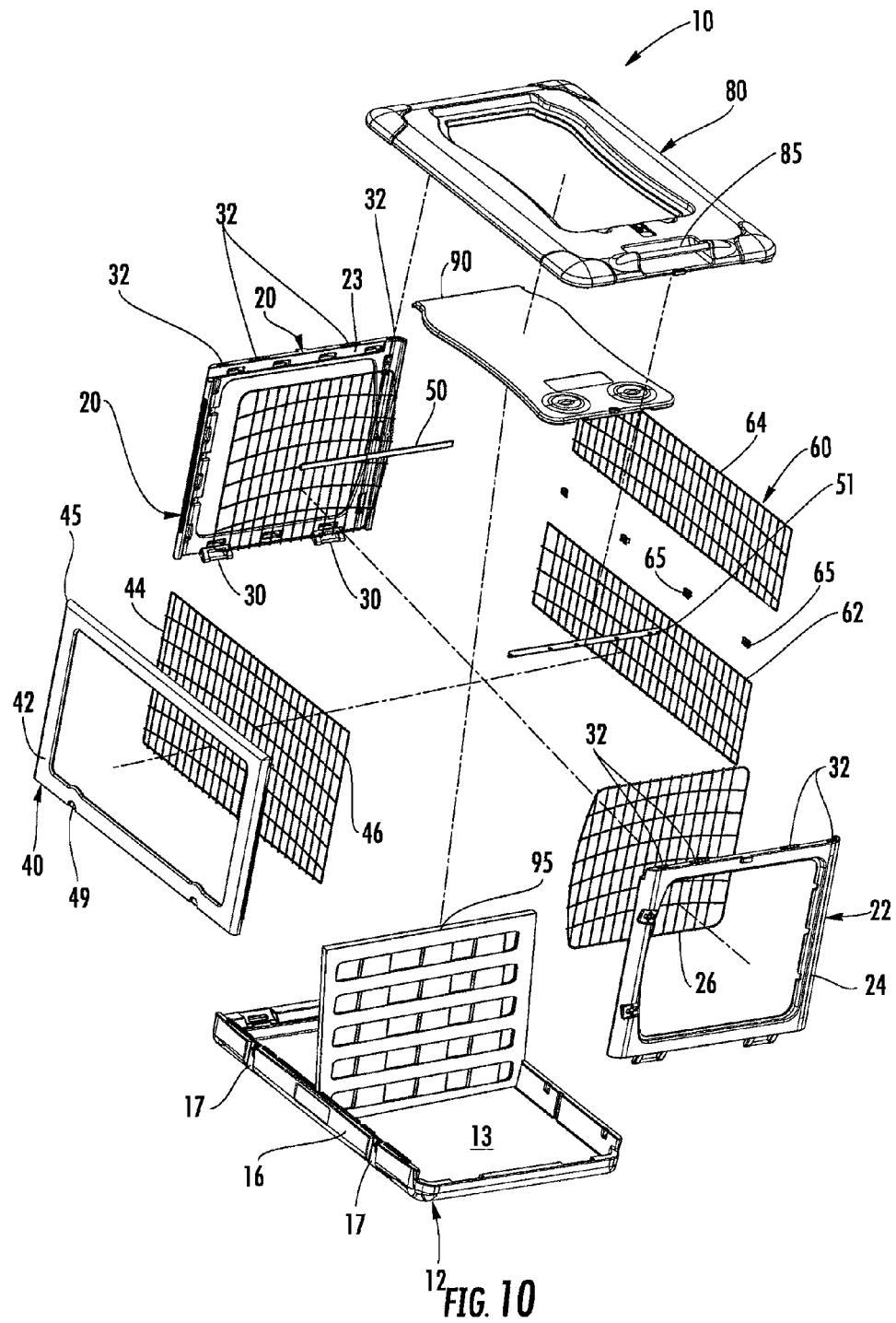
FIG. 10 is an exploded perspective view of the pet crate of FIG. 1.
Figure 11:
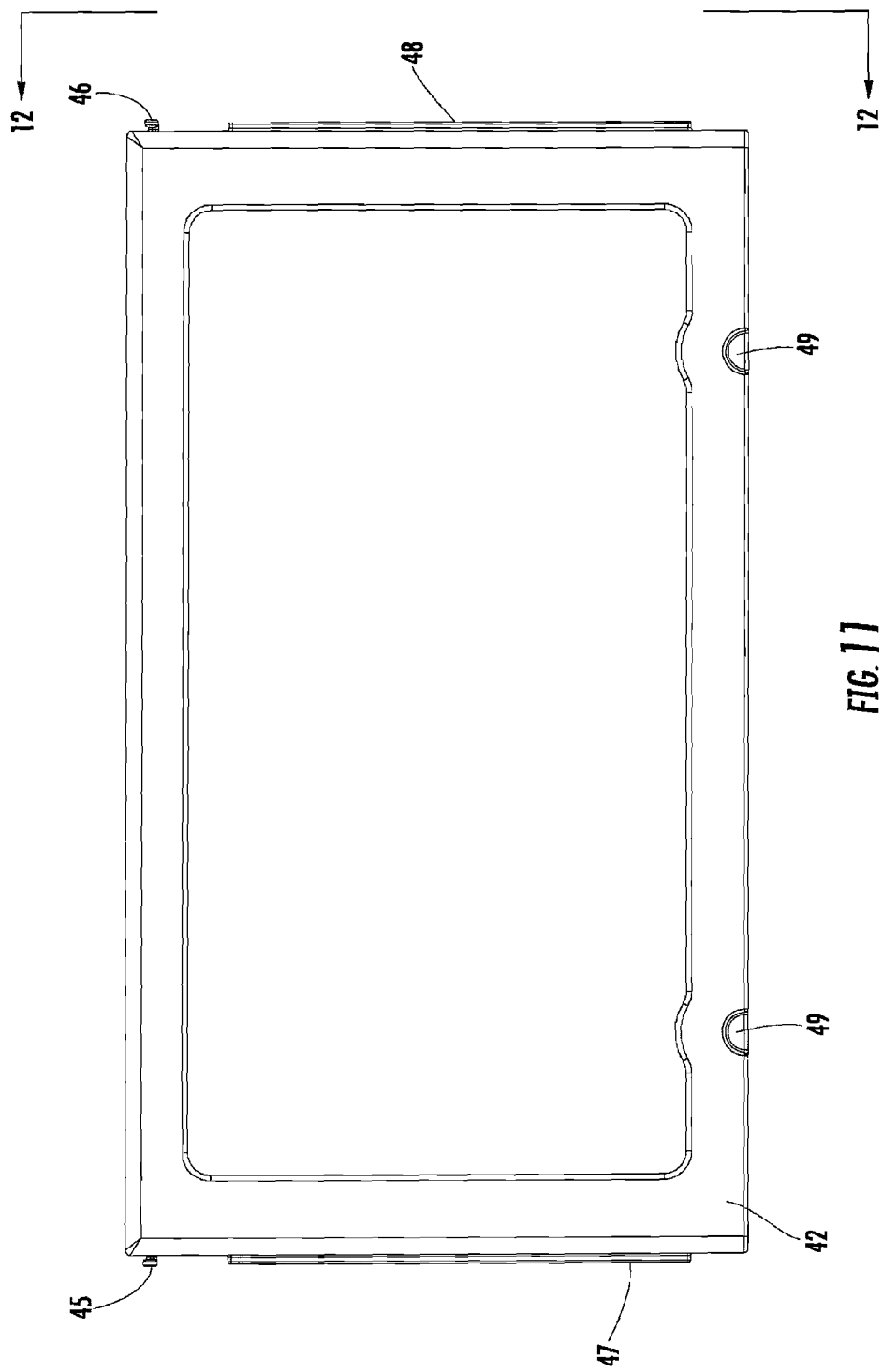
FIG. 11 is a detail view of the front door frame of the pet crate of FIG. 1.
Figure 12:
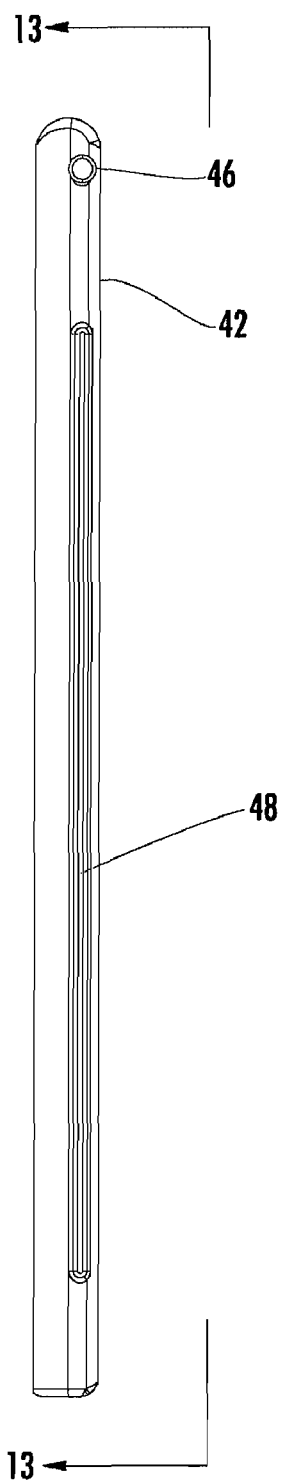
FIG. 12 is a view taken along line 12-12 in FIG. 11.
Figure 13:
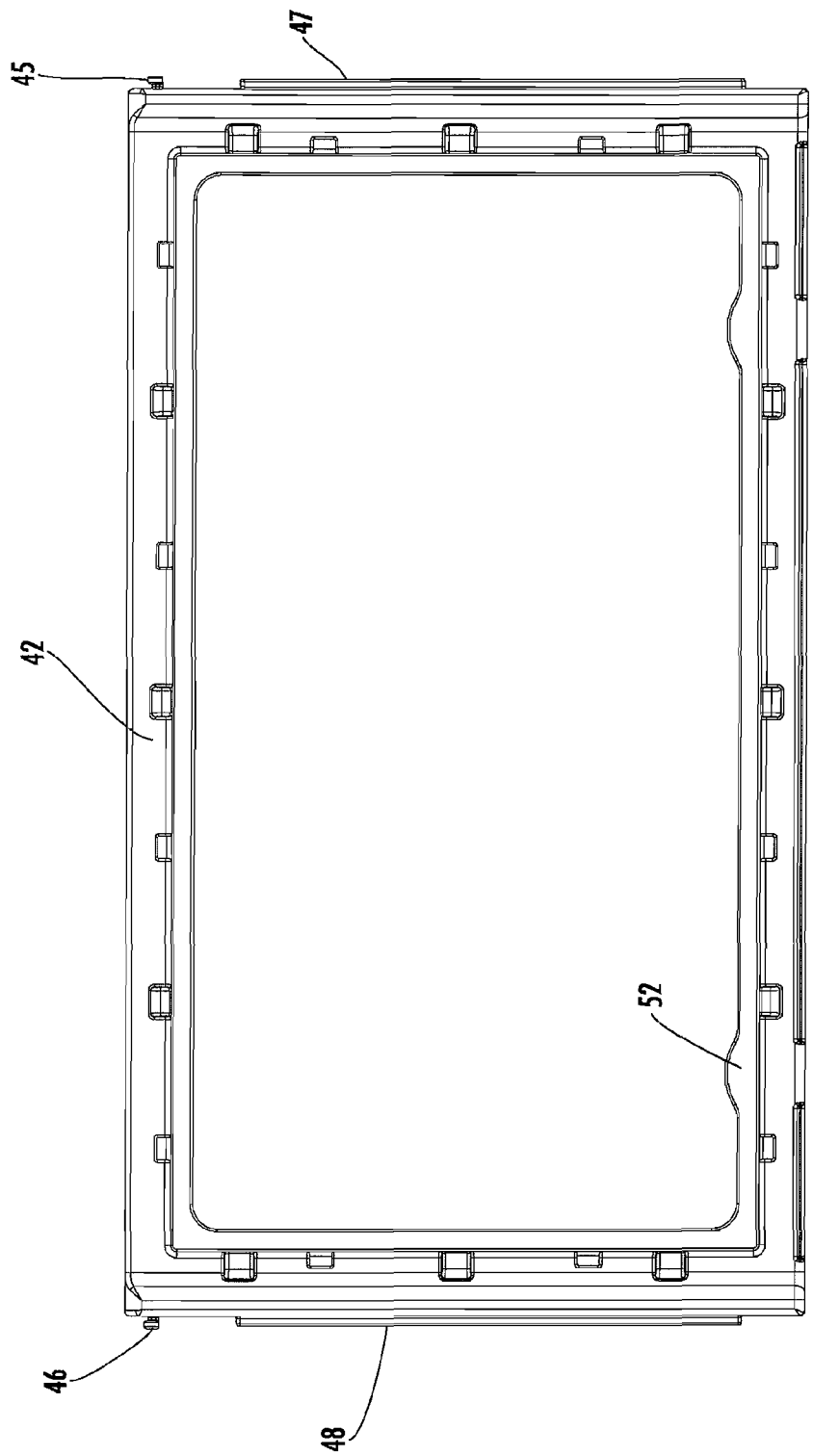
FIG. 13 is a view taken along line 13-13 in FIG. 12.

As shown in FIGS. 10 and 16, projections 32 are also provided along the top edges of the frames 23, 24 for engagement with the top panel 80. Preferably, the left side and right side frames 23, 24 are made of blow molded single-piece polymeric material, such as polypropylene. Those skilled in the art will recognize that other suitable polymeric materials may also be utilized. While the right side 24 has been shown in detail in FIGS. 16 and 17, those skilled in the art will note that the left side 23 is generally a mirror image thereof, with the exception of the placement of the latch receiving recesses being switched from front to back and the hinge location for the grate 25 being moved to the front of the left side 23.

Figure 25:
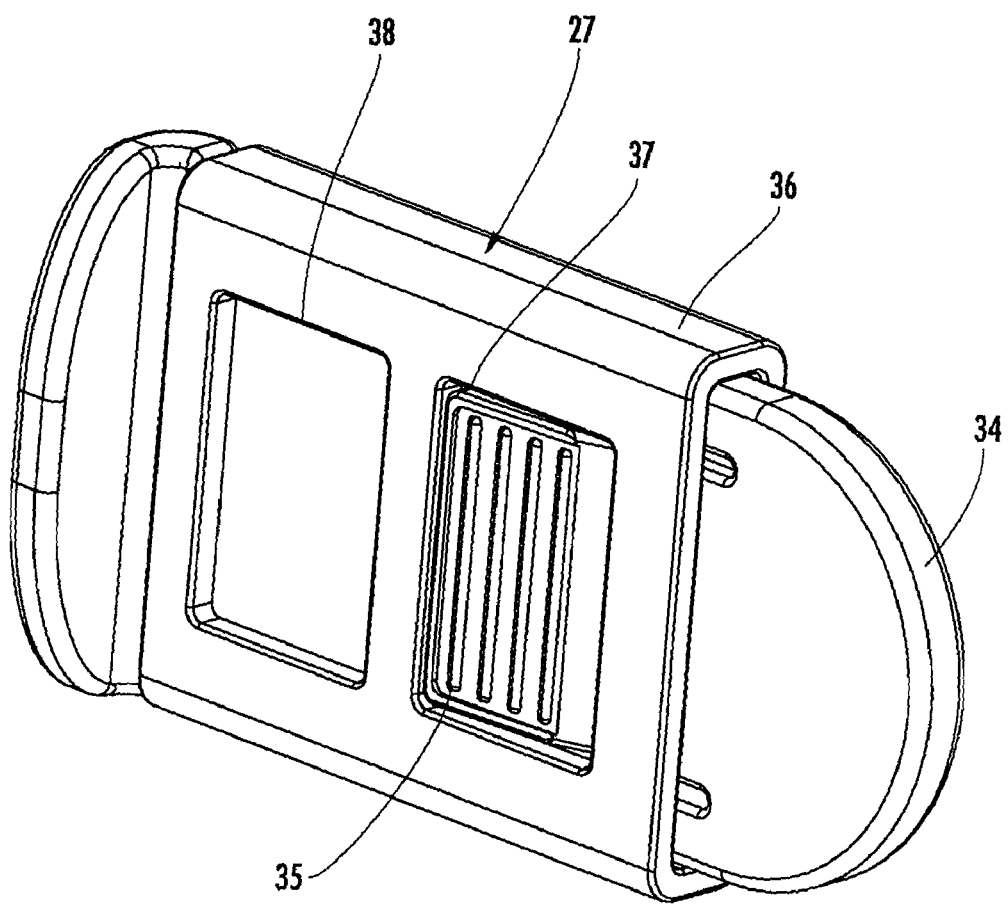
FIG. 25 is a detail perspective view of the latch.

The pivotably attached grates 25, 26 are preferably formed of welded steel and may be painted or coated with a polymeric or chromed material depending upon the particular application. Alternatively, they may be made from stainless steel or any other suitable material. The latches 27, shown in detail in FIG. 25, are preferably made of a polymeric material and are attached to the frames using mechanical fasteners, adhesive or any other suitable means. Although the exploded view in FIG. 10 shows the grates 25, 26 located inside the respective frames 23, 24 for illustrative purposes, they are in fact located on the outside of the frames 23, 24 and pivot outwardly to open. The latches 27 hold the grates 25, 26 in the closed position by trapping the free ends of the grates 25, 26 opposite the pivotal attachment between the recessed portion of the frames 23, 24 and the extended latch tongue 28.

It is noted that the width of the frames 23, 24 is less than a distance between the front wall 16 and rear wall 18 of the base 12 so that both the left side 20 and the right side 22 can be pivoted downwardly about the hinges 30 into a folded position on top of the bottom panel 13 of the base 12.

A catch 66 shown in FIG. 17 for the right side 22, and shown in detail in FIG. 24a, is used to hold the split rear wall 60 in the open position. The catch 66 is pivotably connected to the back of both the left and right sides 20, 22. For the left side 20, the catch 66 would be similarly mounted in the opposing position to the right side 22. The catch 66 can be a simple hook or a flexible catch and can have either a smooth or ribbed surface, and holds the split back panel 60 in the opened configuration against the back edges of the left and right sides 20, 22. As shown in FIG. 24a, the preferred catch 66 is preferably a C-shaped hook with a smooth inner surface. An alternate catch is shown in FIG. 24b.

Referring to FIGS. 1-3, 5, 10 and 11-13, the front door 40 of the crate 10 is comprised of the front frame 42 and a front grate 44 affixed thereto. The frame 42 preferably includes pivot pins 45, 46 and slide rails 47, 48 located on opposite sides thereof as shown in detail in FIGS. 11-13. The pivot pins 45, 46 are pivotably held in tracks 50, 51 mounted on the inner side of the top panel 80 along the left and right side edges thereof as described in detail below.

Figure 26:
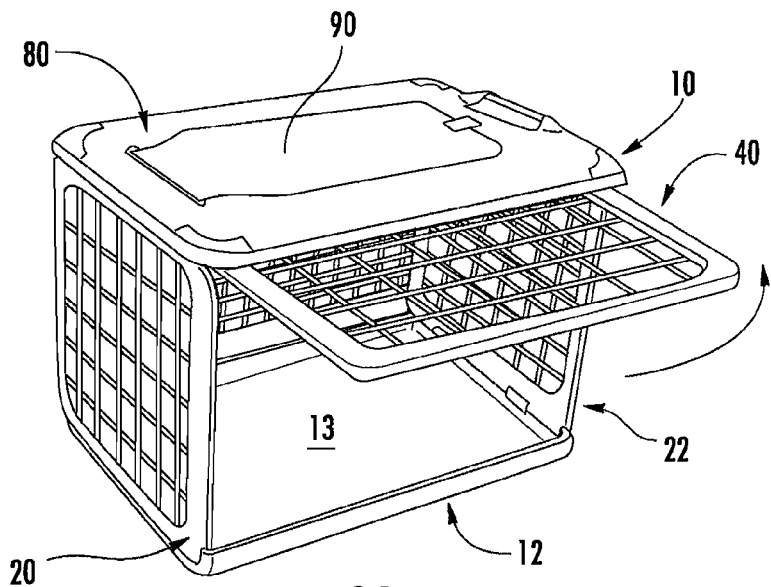
FIG. 26 is a view of the pet crate of FIG. 1 with the front door opened and being slid under the top panel.
Figure 27:
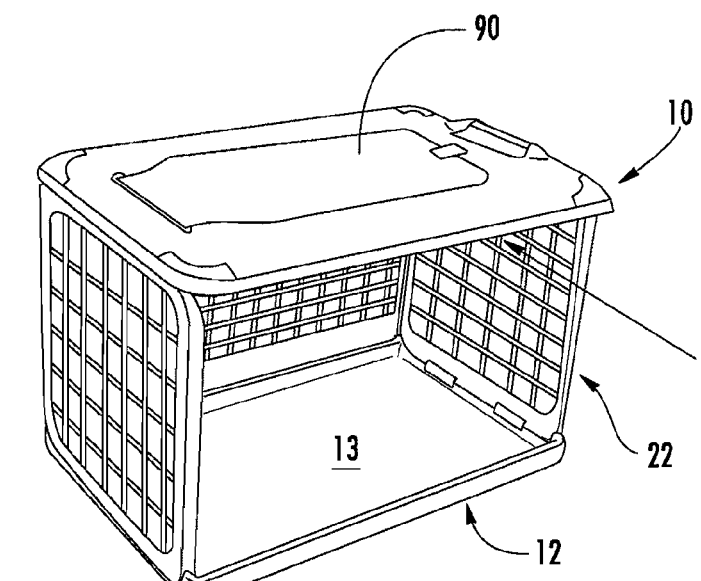
FIG. 27 is a perspective view of the pet crate with the front door slid into a fully stowed position under the top panel.

The slides 47, 48 are sized to fit between the protrusions 31 on the front edges of the left side frame 23 and right side frame 24 when the front door 40 is closed, as shown in FIGS. 1 and 2. Recesses 49 are provided at the bottom front edge of the front frame 42 which are engaged by latches 27 mounted on the front wall 16 of the base 12 in order to hold the front door 40 in a closed position. Releasing the latches 27 allows the front door 40 to pivot open about the pivot pins 45, 46 and then be slid inwardly via the slide rails 47, 48 moving along the door tracks 50, 51 into a stowed position under the top panel 80, as shown in FIGS. 26 and 27.

In the preferred embodiment, the front door frame 42 is preferably made of blow molded polymeric material, such as polypropylene. Those skilled in the art will recognize that other suitable polymeric materials may be utilized. As shown in detail in FIG. 13, preferably a recess 52 is provided for mounting the grate 44 into the frame 42. As the grate 44 is fixed mounted preferably using mechanical fasteners or clips or the like, it is mounted from the inside of the front door frame 42 and thus the front door 40 presents an outward smooth flush appearance, which facilitates its sliding into the open, stowed position under the top panel 80.

The front door grate 44 is preferably made of a metallic material, and can be painted, polymeric coated, or chrome coated steel, or may be made of stainless steel or any other suitable material.

Figure 8:
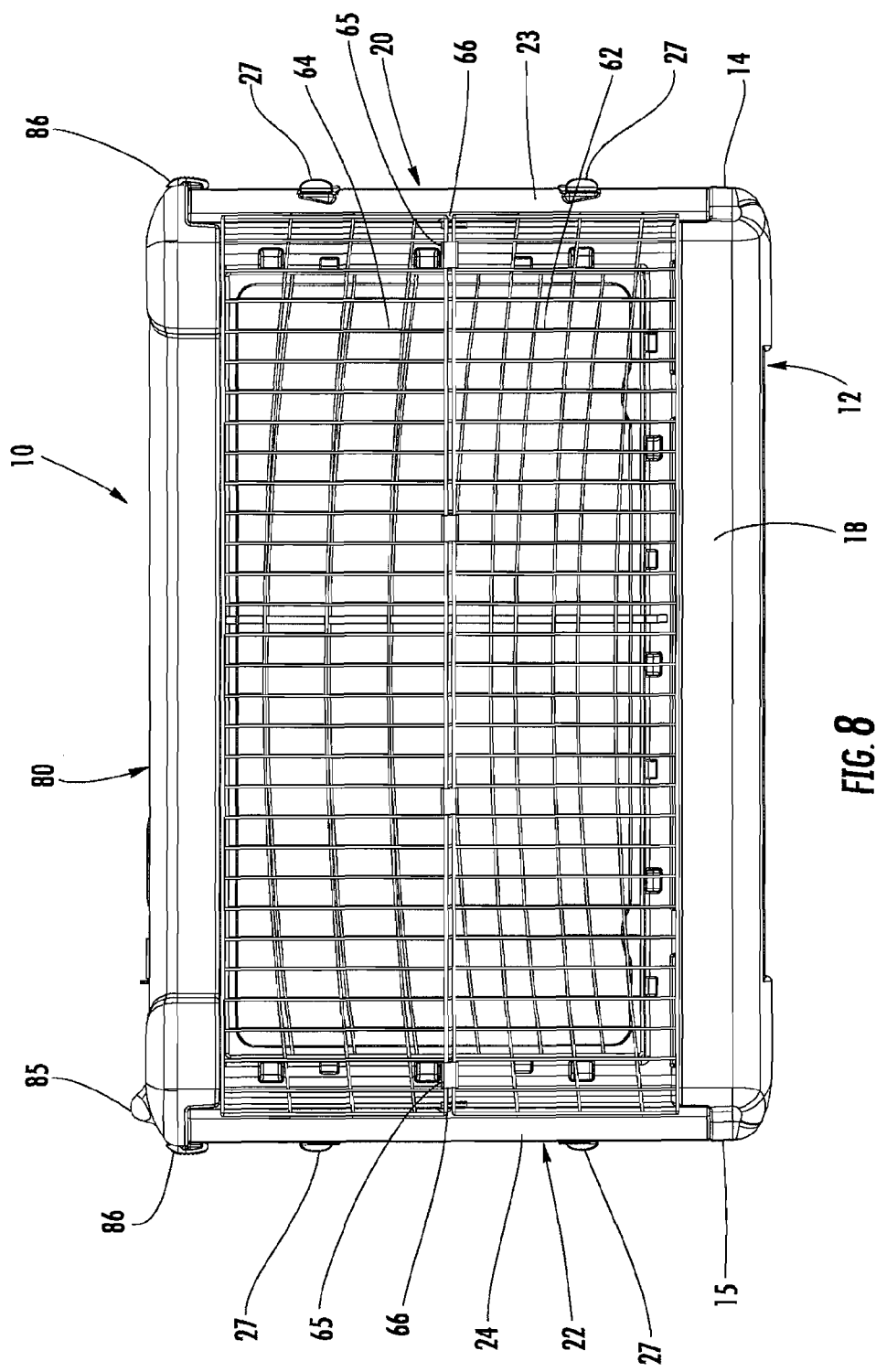
FIG. 8 is a back view of the pet crate of FIG. 1.
Figure 9:
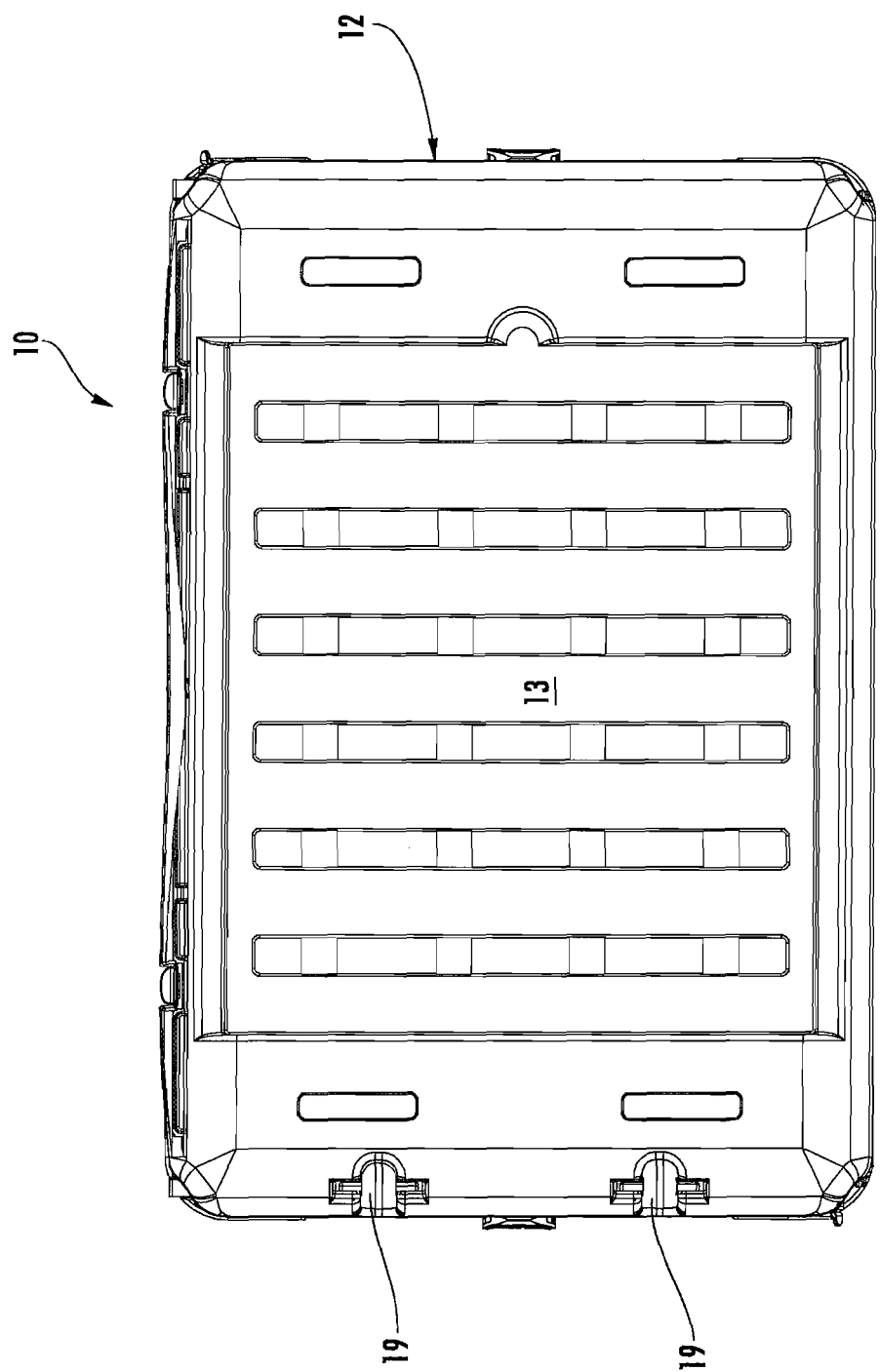
FIG. 9 is a bottom view of the pet crate of FIG. 1.

Referring now to FIGS. 3, 8 and 10, the foldable split rear wall 60 will be described in detail. The foldable split rear wall 60 includes a lower grate 62 and an upper grate 64 which are pivotably connected together along a medial portion by tubular clips 65 along the adjoining edges thereof. The bottom edge of the lower grate 62 is pivotably connected to the upper portion of the rear wall 18 of the base 12 using clips or brackets to allow pivoting movement of the lower grate 62 relative to the base 12. The upper edge of the upper grate 64 is pivotably connected to the back edge of the top panel 80, preferably using clips or brackets to allow pivoting movement of the upper grate 64 relative to the top panel 80. Preferably, the catches 66 or 66' shown in FIG. 17 and in greatly enlarged detail in FIGS. 24a and 24b, are pivotably mounted to the back edges of the left side frame 23 and right side frame 24. These catches can be pivoted so that the center region of the rear wall 60 is hooked and held in position against the back edges of the left and right side frames 23, 24 respectively. With the preferred catches 66, the slot in the catch 66, shown in FIG. 24a is large enough to engage the bottom wire of the upper grate 62 and the top wire of the bottom grate 64. These catches 66 can also be pivoted upwardly in order to release their engagement with the horizontal bars used to form the upper and lower grates 62, 64 in order to allow the rear wall 60 of the pet crate 10 to be folded in half to facilitate folding of the pet crate 10, as discussed in further detail below. Alternatively, the catches 66' of FIG. 24b could be used.

The upper and lower grates 62, 64 are preferably formed of a metallic material and may be painted, polymeric coated or chrome coated steel, stainless steel or any other suitable material. The catches 66 are preferably formed of a polymeric material and preferably include teeth 67 to help engage and hold their position on the bars forming the grates 62, 64.

Referring now to FIGS. 1, 2, 7, 10 and 18-21, the top panel 80 is shown in detail. The top panel 80 includes a frame 82 having a door recess 83 in which a top hatch door 90 is located.

Figure 19:
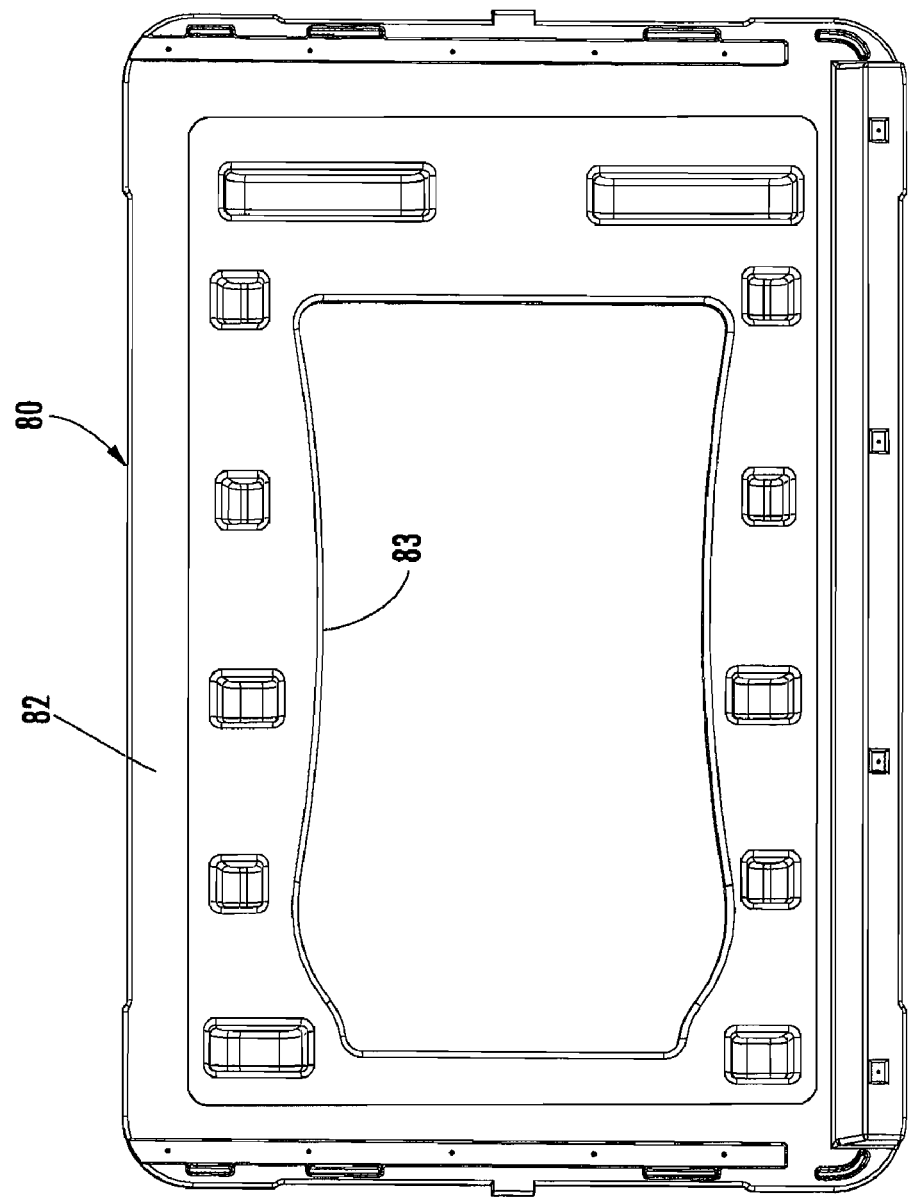
FIG. 19 is a bottom view of the pet crate top of FIG. 18.
Figure 20:
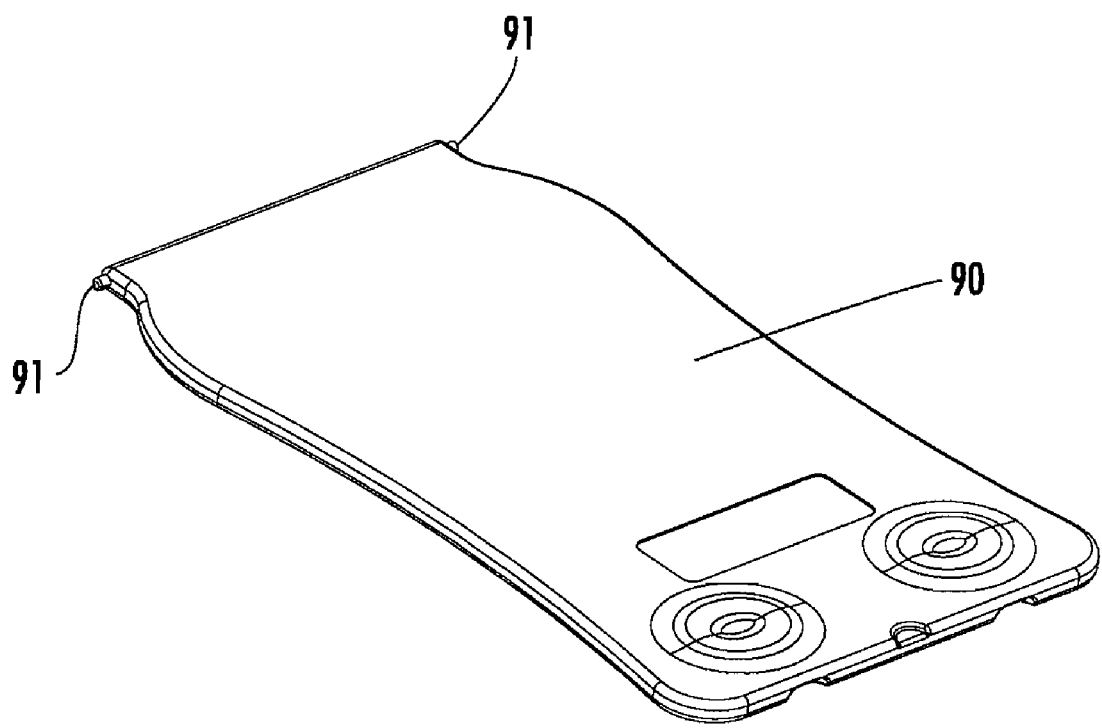
FIG. 20 is a detailed perspective view of the top door for the pet crate.
Figure 21:
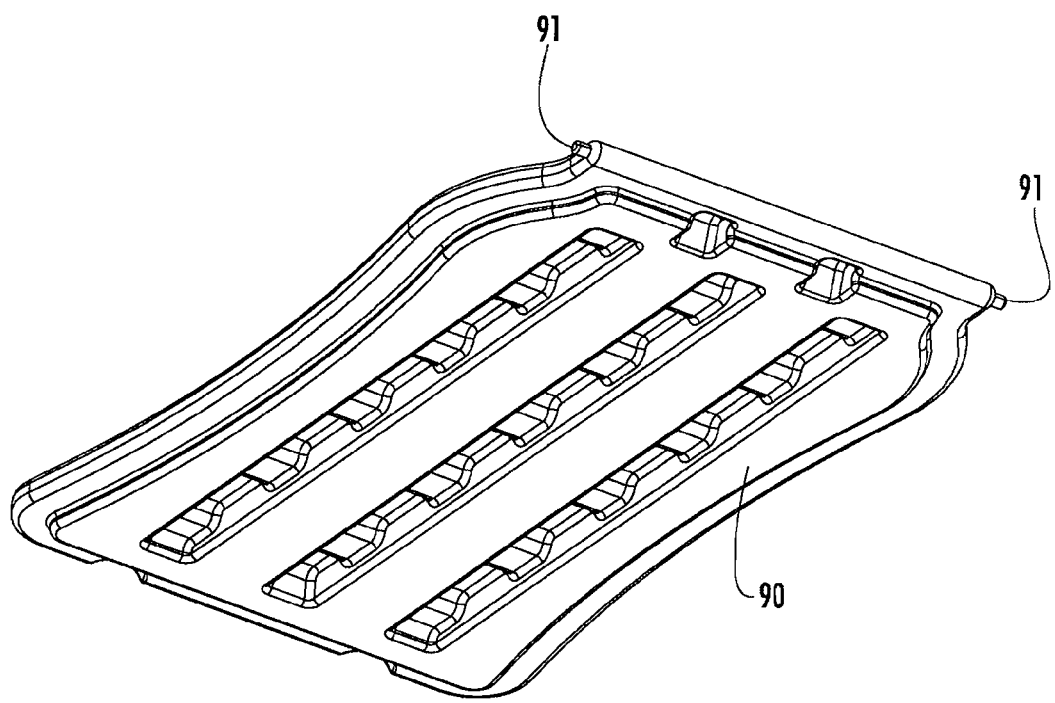
FIG. 21 is a view looking at the bottom of the top door shown in FIG. 20.
Figure 22:
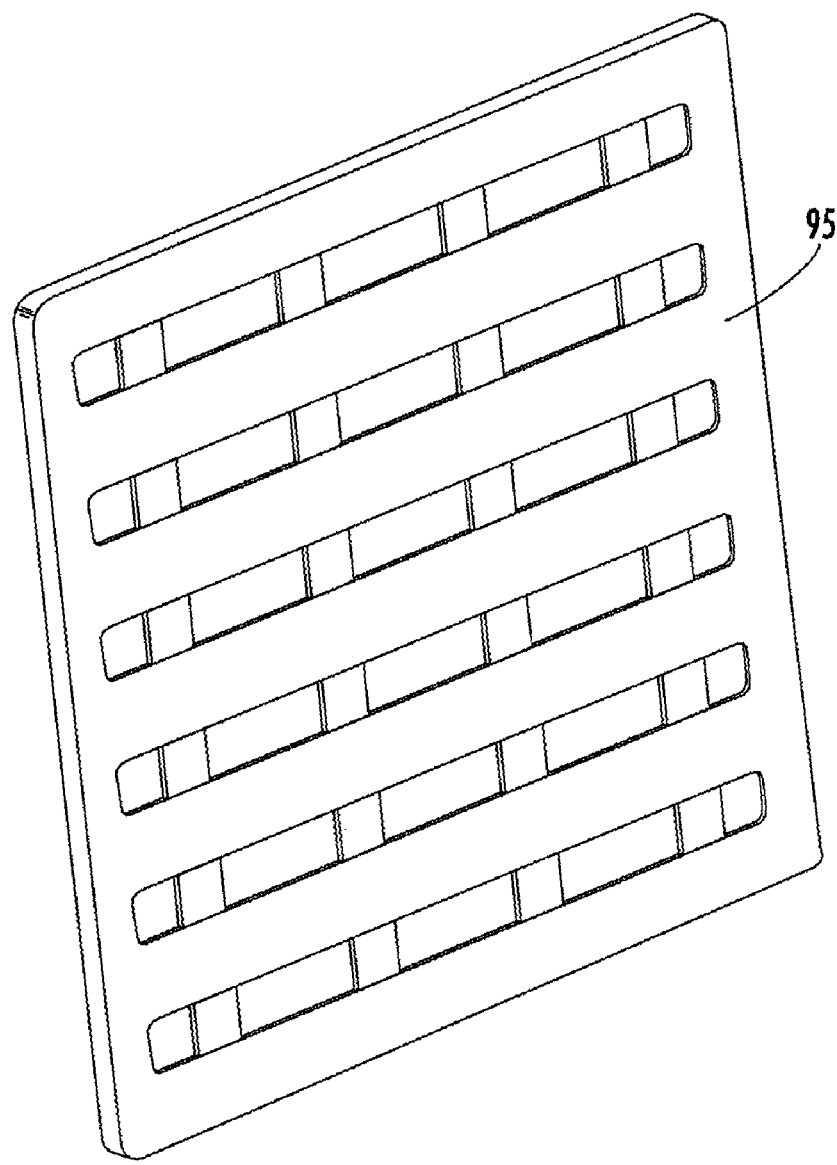
FIG. 22 is a perspective view showing the pet crate divider.
Figure 23:
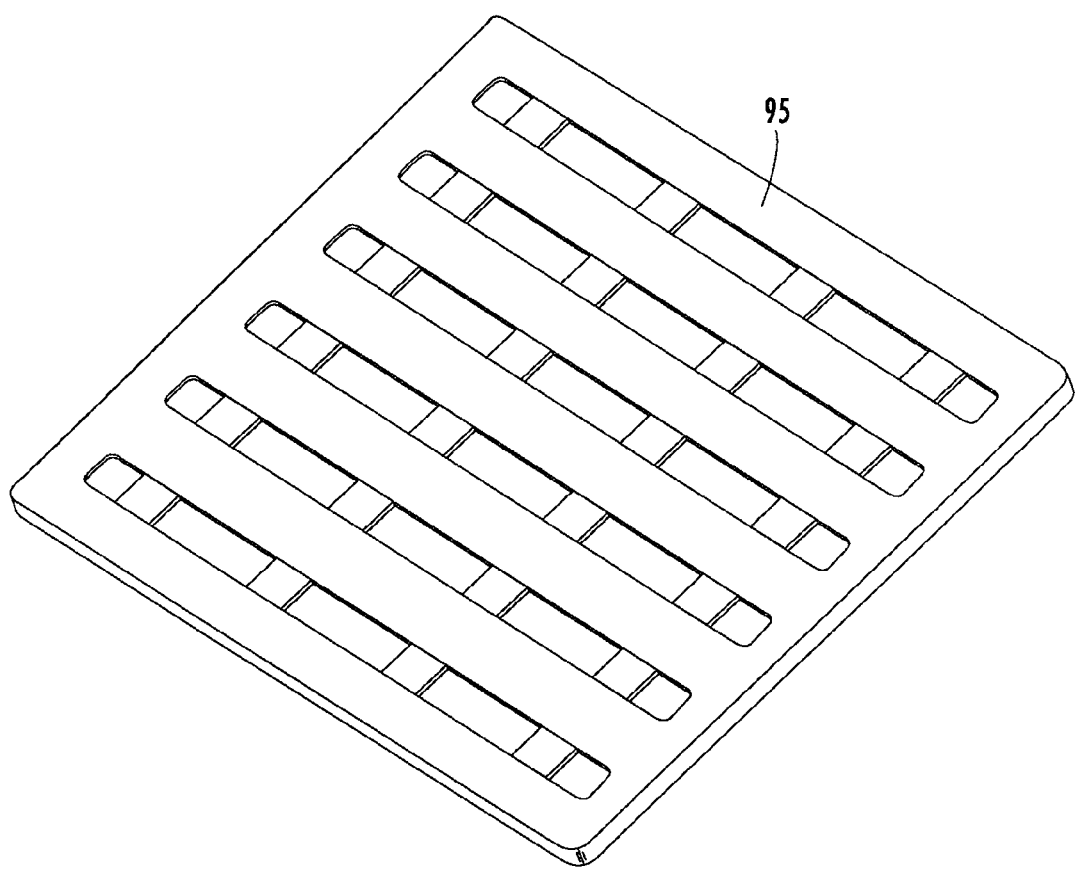
FIG. 23 is an opposite perspective view showing the pet crate divider.

As shown in FIG. 19, recesses 87 are provided along the bottom facing left and right sides of the top frame 82 which are complementary to the engagement projections 32 provided along the top edges of the left and right side frames 23, 24. The front door tracks 50, 51 are preferably connected to the underside of the top frame 82 along the left and right sides and may be connected using mechanical fasteners, adhesives or any other suitable means. The handle 85 is preferably located along the right side edge of the top panel 80 opposite from the wheels 11 located on the base 12. Latches 86 are provided at each of the left and right sides of the top 80. As shown in FIGS. 34a and 34b, the latches 86 may be moved between open and closed positions. The latches 86 are preferably over-center pivotable latches as shown in FIGS. 34a and 34b, or can be of any other suitable type, such as the latch assemblies 27 or other types of latches or catches for engaging or releasably holding two pieces together. The latches 86 engage protrusions at the top edges of the left and right sides 20, 22, respectively, as shown in FIG. 34a, and then are pivoted upwardly about a connecting link which also pivots to an over-center position to retain the top panel 80 in the assembled position.

The top frame 82 is preferably a blow molded polymeric part and includes stiffening recesses located on the underside thereof as shown in FIG. 19. These provide a structure that is both lightweight and having high rigidity based on the formation of the frame 82 as a blow molded part.

Preferably, the top door 90 has hinge pins 91 and is pivotably mounted in the door recess 83 of the top frame 82. A latch 27 is also mounted in a latch recess 88 in the top frame, shown in FIG. 18, opposite from the hinge side of the top door 90 to hold the top door 90 closed. Preferably finger recesses are molded into the top frame 82 along the edge of the door recess 83 to allow for easier opening of the door 90 when the latch 27 is released. The door 90 is preferably a blow-molded polymeric part, and is shown in detail in FIGS. 20 and 21. The hinge pins 91 are preferably integrally molded to the door 90. Stiffening recesses are preferably provided in the underside of the top door 90 and are clearly shown in FIG. 21.

Referring to FIG. 25, the latch assembly 27 is shown in detail, and includes a slide member 34 located in a tubular body 36. A flexible catch 35 on the slide member 34 is normally biased outwardly, and extends through openings 37 or 38 in the body 36. In the illustrated position, in which the latch assembly 27 would be closed, the flexible catch is in the first opening 37. In order to open the latch assembly, the flexible catch 35 is pressed inwardly, and the slide member is moved back so that the flexible catch 35 passes under the frame piece between the openings 37, 38, and then springs elastically out to its normal position and catches in the second opening 38. Based on the arrangement of the flexible catch 35 with the fixed end being located to the right in FIG. 25, and the free end that acts as a catch being toward the left, the latch can be closed by just pushing the slide member 34 to the right, with the flexible catch 35 being automatically deflected by the frame piece as the slide member moves toward the right in FIG. 25, toward the illustrated closing position.

Referring now to FIGS. 26-33, a series of views are shown of the crate 10 being broken down from the fully assembled position to the folded position. Referring to FIG. 26, the pet crate 10 is shown with the front door 40 having been folded upwardly about the pivot pins 45, 46 and being shown in the process of sliding inwardly along the left and right door tracks 50, 51. This is accomplished via releasing the latches 27 located along the front wall 16 of the base 12 which allows the front door 40 to initially pivot open.

Figure 28:
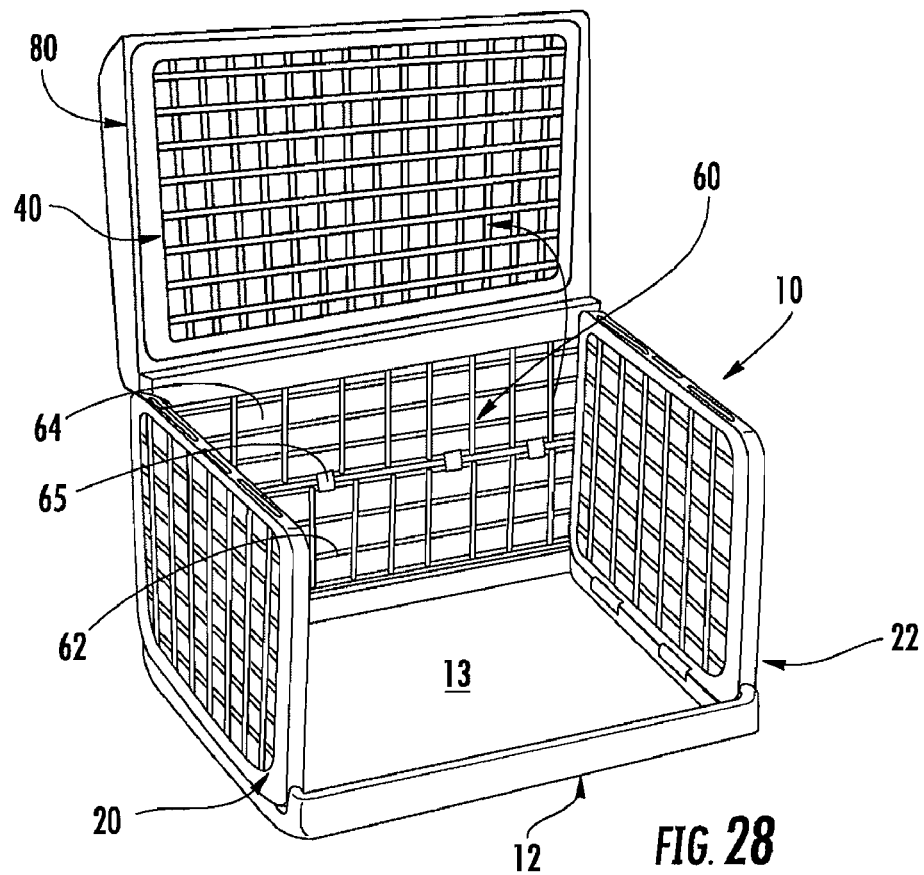
FIG. 28 is a perspective view of the pet crate with the top latches having been released and the top panel with stowed front door being folded upwardly for collapsing the crate to a folded configuration.

FIG. 27 shows the front door 40 in the totally stowed position under the top panel 80. After releasing the catches 66 and the top latches 86, the top panel can now be pivoted upwardly about its back edge, and FIG. 28 shows the top panel 80 pivoted up to a vertical position.

Figure 29:
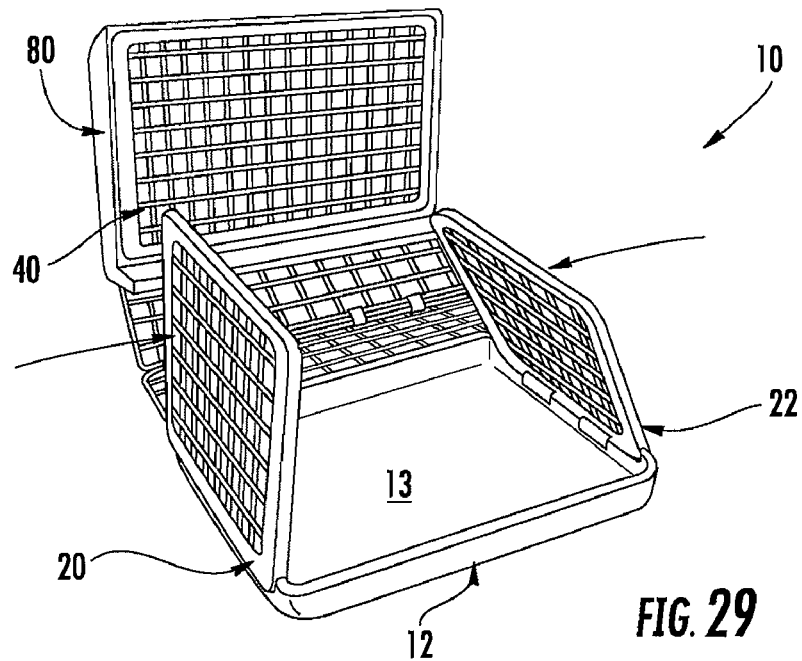
FIG. 29 is a perspective view of the pet crate with the back panel having the catches released and pivoted backward with the top panel, and the right side being folded inwardly into the base.
Figure 30:
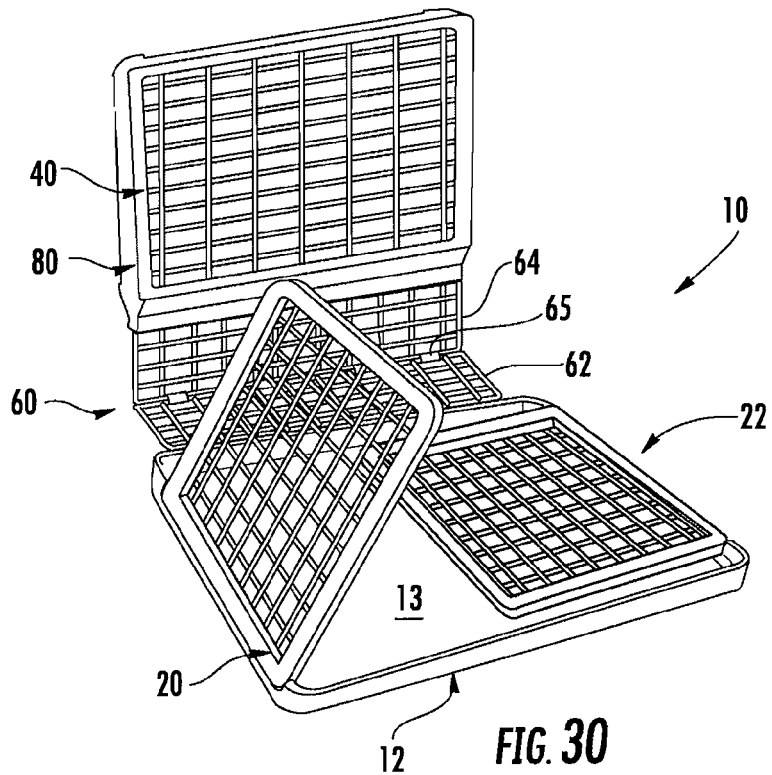
FIG. 30 is a perspective view of the pet crate with the right side fully folded into the base and the left side being folded into the base.
Figure 31:
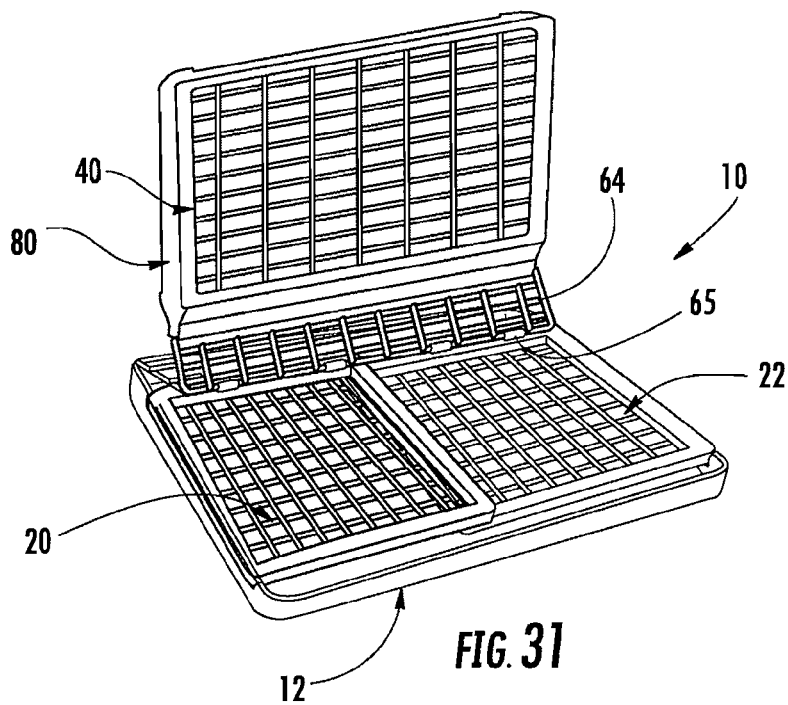
FIG. 31 is a perspective view of the pet crate with the back panel being folded inwardly along the center split over the left and right sides which are fully folded onto the base.

FIG. 29 shows the tope panel 80 and split rear wall 60 pivoted further back away from the left and right sides, and the right side 22 is being folded inwardly on top of the base 12 about the hinges 30. FIG. 30 shows the left side 20 being folded down on top of the base 12 while the user holds the top panel 80 off to the rear, while it is still connected to the base 12 via the split rear wall 60. FIG. 31 shows the split rear wall 60 having been now folded inwardly, so that the bottom edge of the top grate 64 and the top edge of the bottom grate 62 extend inwardly and the top grate 64 folds on top of the bottom grate 62 allowing the rear edge of the top panel 80 to be lowered against the top of the rear wall 18 of the base 12.

Figure 32:
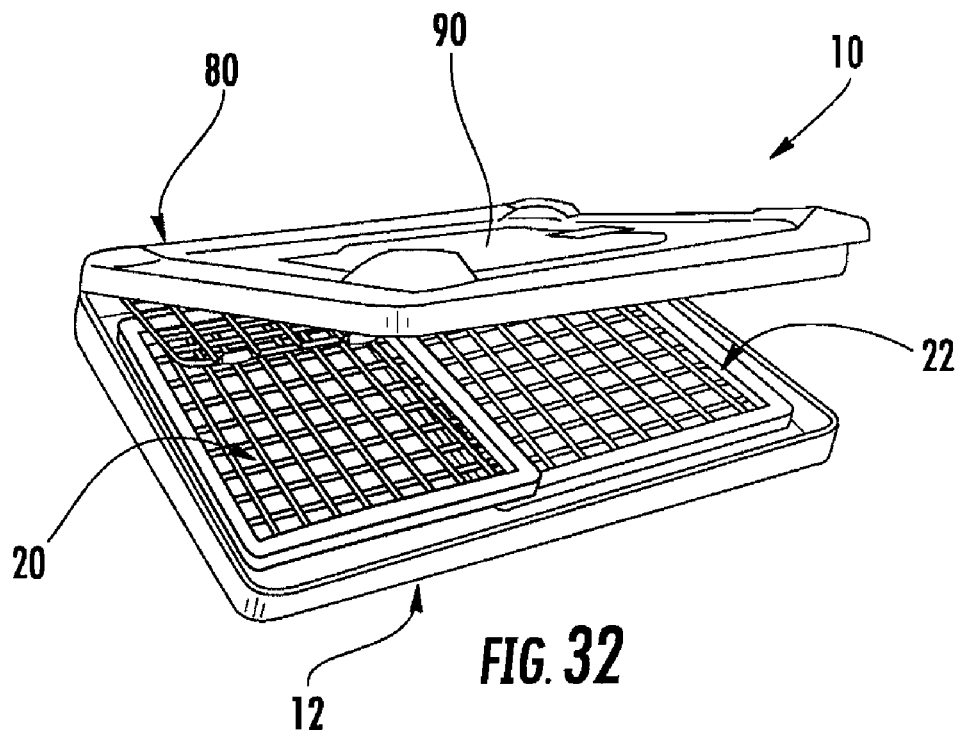
FIG. 32 is a perspective view of the pet crate with the top panel lowered so that the back edge is against the top, back wall of the base, and being folded over the split back panel and left and right side panels which are in the fully folded position.
Figure 33:
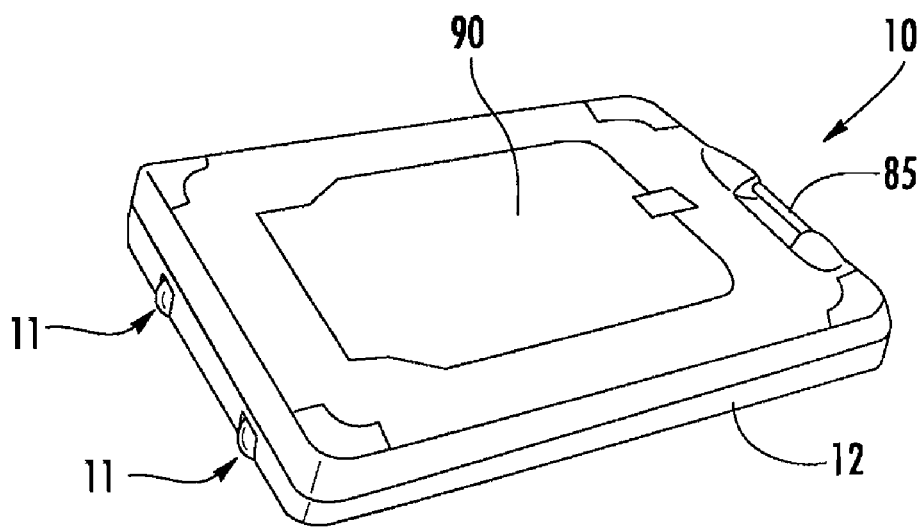
FIG. 33 is a perspective view of the fully folded configuration of the pet crate of FIG. 1.

FIG. 32 shows the top panel 80 now being folded downwardly on top of the base 12 in which the left and right sides 20, 22 and the split rear wall 60 having already been folded into the recess created by the front and rear walls 16, 18 of the base 12. FIG. 33 shows the crate 10 in the fully folded configuration. Clamps, latches or straps may be provided to secure the crate 10 in this folded configuration, which may be separate from or incorporated into the base 12 or the top panel 80. In this configuration, a user can grasp the handle 85 and roll the folded crate 10 via the wheels 11 located on the base 12 on the opposite side from the handle 85.

While the preferred embodiment of the present invention has been described in detail, it will be recognized by those skilled in the art from the present disclosure that changes may be made to the above described embodiment of the invention without departing from the broad inventive concept thereof. It is understood, therefore, that this invention covers all modifications are within the scope and spirit of the invention as defined by the appended claims and/or shown in the attached drawings.

What is claimed is:

1. A foldable pet crate, comprising:
   a base,
   a top panel,
   two side panels pivotably connected to the base,
   a single split rear wall having upper and lower panels pivotably connected to one another along a medial portion thereof,
   a top edge of the split rear wall pivotably connected to the top panel and a bottom edge of the split rear wall connected to the base,
   a front door, opposite the split rear wall, pivotably and slidably connected to the top panel, and slidably stowable along an inner side of the top panel,
   the base, the side panels, the split rear wall, the top panel and the front door defining a main confine area, and
   the side panels, the split rear wall, the top panel, and the front door are foldable onto the base.

2. The foldable pet crate of claim 1, wherein the base further comprises left, right, front and back base walls, and a bottom panel.

3. The foldable pet crate of claim 1, wherein the lower panel is pivotably connected to the base.

4. The foldable pet crate of claim 1, wherein the front door has at least one front latch affixed thereto.

5. The foldable pet crate of claim 1, wherein the base is made of a polymeric material.

6. The foldable pet crate of claim 1, wherein the top panel includes left and right edges releasably connected to top edges of the side panels.

7. The foldable pet crate of claim 6, wherein the base includes corners that are rounded.

8. The foldable pet crate of claim 1, wherein the base further comprises at least one wheel recess formed within the base, sized to accommodate a wheel, and at least one wheel detachably connected to the base.

9. The foldable pet crate of claim 1, wherein each of the side panels further comprises:
   a panel frame,
   an opening formed in a center thereof,
   an air-permeable grate positioned over the opening,
   at least one latch affixed to the panel frame to detachably retain the grate in a closed-position,
   a catch affixed to a rear portion of the panel frame to hold the split rear wall in an upright position, and
   a width of each of the side panels is less than a distance between the front door and the split rear wall.

10. The foldable pet crate of claim 9, wherein the grate is detachably and pivotably fixed to the panel using a plurality clips.

11. The foldable pet crate of claim 10, wherein the grate comprises a metal mesh, a fabric screen, or a flat panel with holes formed therein.

12. The foldable pet crate of claim 1, wherein each of the side panels is pivotably mounted to the base by two hinge lugs extending from each of the side panels that are connected to the base via brackets.

13. The foldable pet crate of claim 9, wherein the side panels each have engagement protrusions along a front panel edge and engagement projections along the top panel edge thereof.

14. The foldable pet crate of claim 1, further comprising a center divider connected to the base, the center divider splitting the main confine area into two confine areas.

15. The foldable pet crate of claim 14, wherein the center divider slides into channels formed in the top panel and the base.

16. The foldable pet crate of claim 9, the top panel further comprising
   front, rear, left, and right sides,
   left and right tracks are affixed to an underside thereof proximate to the left and right sides for receiving front door pivot pins for slidable movement of the front door.

17. The foldable pet crate of claim 16, wherein the top panel further comprises
   left and right edges releasably connected to top edges of the side panels by left and right latches located on the respective edges, the latches releasably connecting the left and right edges with the left and right side panels, respectively,
   a top hatch door recess,
   a top hatch door pivotably mounted in the top hatch door recess,
   a closure latch assembly mounted within a closure latch recess for detachably maintaining the top hatch door in a closed position,
   a top handle, and
   hinge pins integrally molded to the top hatch door for pivoting the top hatch door between open and closed positions.

18. The foldable pet crate of claim 17, wherein the closure latch assembly further comprises
   a tubular body having a plurality of catch openings,
   a slide member telescopingly engaged with the tubular body,
   a spring loaded flexible catch affixed to the slide member, and
   the plurality of catch openings are sized to receive the catch therethrough.

19. The foldable pet crate of claim 16, where the front door further comprises
- side, top, and bottom front frame members defining an opening in which a front grate is located,
- the front door pivot pins extending from the side frame members and pivotably and slidably mounted within the left and right tracks,
- slide rails extending along both of the side front frame members, and
- recesses formed in the base.

20. The foldable pet crate of claim 19, wherein the side panels each have
- engagement protrusions along a front panel edge that engages a front door edge,
- engagement projections along a top side panel edge that engages the top panel, and
- the slide rails rest between the engagement protrusions when the front door is in a closed position.

21. The foldable pet crate of claim 19, wherein the at least one latch engages the recesses to hold the front door in a closed position.

22. The foldable pet crate of claim 19, wherein the front grate is mounted within the opening by fasteners.

23. The foldable pet crate of claim 9, wherein
- the lower panel comprises a lower grate that is pivotably connected to the upper panel of the split rear wall,
- the upper panel comprises an upper grate that is pivotably connected to a back edge of the top panel,
- a clip that pivotably connects the lower grate and the upper grate together, and
- catches with teeth pivotably mounted on the side panels that detachably engage at least one of the lower and the upper panels.

24. A method for stowing a foldable crate comprising:
- providing a pet crate that includes a base, a left side, a right side, and a single split rear wall,
- providing a front door, opposite the split rear wall, with latches, side frame members, and pivot pins extending from the side frame members,
- providing a top panel with tracks, side edges, and latches located on the side edges,
- providing a top panel and a bottom panel in the split rear wall,
- releasing the latches on the front door,
- opening the front door by pivoting the front door open about the pivot pins,
- sliding the front door inwardly along the tracks into a stowed position under the top panel,
- releasing latches located on the side edges,
- folding the top panel and the front door stowed under the top panel upwardly about a back edge of the top panel,
- folding the right side inwardly on top of the base about hinges located between the base and the right side,
- folding the left side down on top of the base about hinges located between the base and the left side,
- folding the split rear wall inwardly so that a bottom edge of the top panel and a top edge of the bottom panel extend inwardly and the top panel folds on top of the bottom panel allowing a rear edge of the top to be lowered against a top of the base,
- folding the top downwardly on top of the base, and
- securing the foldable crate in a folded position.

* * * * *